(12) United States Patent
McClements, IV

(10) Patent No.: US 9,384,512 B2
(45) Date of Patent: Jul. 5, 2016

(54) MEDIA CONTENT CLIP IDENTIFICATION AND COMBINATION ARCHITECTURE

(75) Inventor: James Burns McClements, IV, Boulder, CO (US)

(73) Assignee: Quib, Inc., Boulder, CO (US)

( * ) Notice: Subject to any disclaimer, the term of this patent is extended or adjusted under 35 U.S.C. 154(b) by 935 days.

(21) Appl. No.: 13/323,624

(22) Filed: Dec. 12, 2011

(65) Prior Publication Data

US 2012/0150698 A1 Jun. 14, 2012

Related U.S. Application Data

(60) Provisional application No. 61/421,945, filed on Dec. 10, 2010, provisional application No. 61/432,395, filed on Jan. 13, 2011, provisional application No. 61/432,397, filed on Jan. 13, 2011, provisional application No. 61/439,189, filed on Feb. 3, 2011, provisional application No. 61/439,196, filed on Feb. 3, 2011.

(51) Int. Cl.

| | |
|---|---|
| G06F 15/16 | (2006.01) |
| G06Q 50/00 | (2012.01) |
| G06Q 10/10 | (2012.01) |
| G06Q 30/06 | (2012.01) |
| G11B 27/034 | (2006.01) |
| G11B 27/34 | (2006.01) |
| G06F 3/0484 | (2013.01) |
| G06F 17/24 | (2006.01) |
| H04N 21/4722 | (2011.01) |
| H04L 29/08 | (2006.01) |
| G06F 17/30 | (2006.01) |

(52) U.S. Cl.
CPC .............. *G06Q 50/01* (2013.01); *G06Q 10/101* (2013.01); *G06Q 30/0643* (2013.01); *G11B 27/034* (2013.01); *G11B 27/34* (2013.01); *G06F 3/0484* (2013.01); *G06F 17/241* (2013.01); *G06F 17/3082* (2013.01); *H04L 67/08* (2013.01); *H04N 21/4722* (2013.01)

(58) Field of Classification Search
CPC .................................................... H04L 67/08
USPC .............................. 709/217; 705/27; 725/32
See application file for complete search history.

(56) References Cited

U.S. PATENT DOCUMENTS

| | | | | |
|---|---|---|---|---|
| 7,735,101 | B2 * | 6/2010 | Lanza et al. | 725/32 |
| 2003/0110503 | A1 * | 6/2003 | Perkes | 725/86 |
| 2004/0205547 | A1 * | 10/2004 | Feldt et al. | 715/512 |
| 2007/0234194 | A1 * | 10/2007 | Tsuchiya et al. | 715/500.1 |
| 2010/0042642 | A1 * | 2/2010 | Shahraray et al. | 707/102 |
| 2010/0043020 | A1 * | 2/2010 | Basso et al. | 725/1 |

* cited by examiner

*Primary Examiner* — Glenford Madamba
(74) *Attorney, Agent, or Firm* — Holland & Hart LLP

(57) ABSTRACT

Methods, systems, and devices are described for associating comments with playback of media content. A user at an input device may select a first point and a second point during a first media content to define a first media content clip. A first comment received at the input device may be associated with the first media content clip. The user may also select a third point and a fourth point during a second media content to define a second media content clip. A second comment received at the input device may be associated with the second media content clip. The input device may associate the first media content clip with the second media content clip based on a playback sequence received from the user.

20 Claims, 19 Drawing Sheets ing drawings. In the appended figures, similar components or
MEDIA CONTENT CLIP IDENTIFICATION AND COMBINATION ARCHITECTURE

CROSS REFERENCES

The present application claims priority to the following patent applications: U.S. Provisional Patent Application No. 61/421,945, filed Dec. 10, 2010, entitled "DYNAMIC MULTIMEDIA COMMENT AND DISPLAY ARCHITECTURE"; U.S. Provisional Patent Application No. 61/432,395, filed Jan. 13, 2011, entitled "SYSTEM, DEVICE, AND INTERFACE ARCHITECTURE FOR COMMENT CREATION"; U.S. Provisional Patent Application No. 61/432,397, filed Jan. 13, 2011, entitled "SCREEN LOCATION COMMENT ARCHITECTURE"; U.S. Provisional Patent Application No. 61/439,189, filed Feb. 3, 2011, entitled "USER SELECTABLE COMMENT FILTER AND RELATED ARCHITECTURE"; and U.S. Provisional Patent Application No. 61/439,196, filed Feb. 3, 2011, entitled "COMMENT DELIVERY ARCHITECTURE," each of which is incorporated by reference in its entirety for all purposes.

The present application is further related to U.S. patent application Ser. No., filed concurrently herewith, entitled "ASSOCIATING COMMENTS WITH PLAYBACK OF MEDIA CONTENT"; U.S. patent application Ser. No. 13/323,610, filed concurrently herewith, entitled "RECOGNITION LOOKUPS FOR SYNCHRONIZATION OF MEDIA PLAYBACK WITH COMMENT CREATION AND DELIVERY"; U.S. patent application Ser. No. 13/323,614, filed concurrently herewith, entitled "PARALLEL ECHO VERSION OF MEDIA CONTENT FOR COMMENT CREATION AND DELIVERY"; U.S. patent application Ser. No.13/323,615, filed concurrently herewith, entitled "ASSOCIATION OF COMMENTS WITH SCREEN LOCATIONS DURING MEDIA CONTENT PLAYBACK"; and U.S. patent application Ser. No. 13/323,619, filed concurrently herewith, entitled "COMMENT DELIVERY AND FILTERING ARCHITECTURE"U.S. patent application Ser. No. 13/323,622; each of which is incorporated herein in its entirety for all purposes.

BACKGROUND

The present invention relates to the creation, storage, and distribution of commentary on media content.

Most people interact quite regularly with recorded media content, such as videos, music, books, and the spoken word. Modern society leans heavily on recorded media content to provide both entertainment and education. With the recent proliferation of portable media players, smartphones, tablet computers and the like, the demand for recorded media content continues to increase.

For many people, social interaction enhances the experience of viewing or listening to recorded media content. For example, the reactions and opinions of one's peers with respect to a certain film may increase that person's enjoyment of the film. In other examples, the perspective of a filmmaker or critic with a unique understanding of a particular film may, when shared, add greater meaning to one's perception of the film.

Often, a person consuming recorded media content may wish to share comments with other consumers of the recorded media content at present or in the future. Additionally, it may be desirable to incorporate comments generated by others with regard to specific portions of recorded media content into the experience of viewing and/or listening to the media content.

SUMMARY

Methods, systems, and devices are described for associating comments with the playback of media content, and for allowing a user to combine, purchase, and store clips from different media content sources and associate comments with the individual clips.

In a first set of embodiments, a method of associating comments with playback of media content includes receiving from a user at an input device a selection of a first point and a second point during a first media content, the first point and the second point defining a first media content clip, and a first comment associated with the first media content clip. A selection of a third point and a fourth point during a second media content, the third point and the fourth point defining a second media content clip, and a second comment associated with the second media content clip are also received from the user at the input device. A playback sequence for the first media content clip and the second media content clip is also received from the user at the input device, and the first media content clip is associated with the second media content clip at the input device based on the playback sequence.

In a second set of embodiments, a method of associating comments with playback of media content includes receiving from an input device a selection of a first media content clip and a first comment associated with the first media content clip. The selection of the first media content clip includes a first point and a second point during a first media content. A selection of a second media content clip and a second comment associated with the second media content clip are also received from the input device. The selection of the second media content clip includes a third point and a fourth point in a second media content. A playback sequence for the first media content clip and the second media content clip are also received from the input device, and the selections of the first and second media content clips and the first and second comments are stored in a data store. The first media content clip is associated with the second media content clip at the data store in accordance with the playback sequence.

In a third set of embodiments, a method of associating comments with playback of media content includes receiving at an output device a first media content clip, a first comment associated with the first media content clip, a second media content clip, a second comment associated with the second media content clip, and a playback sequence. The first media content clip and the second media content clip are played in accordance with the playback sequence. A first indication of the first comment is displayed to a user of the output device during playback of the first media content clip, and a second indication of the second comment is displayed to the user of the output device during playback of the second media content clip.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, devices, and computer program products are described that allow a user to select and splice together clips from different media content sources. The user may also associate one or more comments with the different clips. The combination of clip selections (or time markers for the clip selections, for example) and commentary selected by the user may be uploaded to a central server computer system for distribution to other users over a network. One or more clip selections may be uploaded to the central server computer system and delivered to other users as simple time codes and/or other data which delineates the selected clip from its underlying media content without transmitting or saving the underlying media content in the clip.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
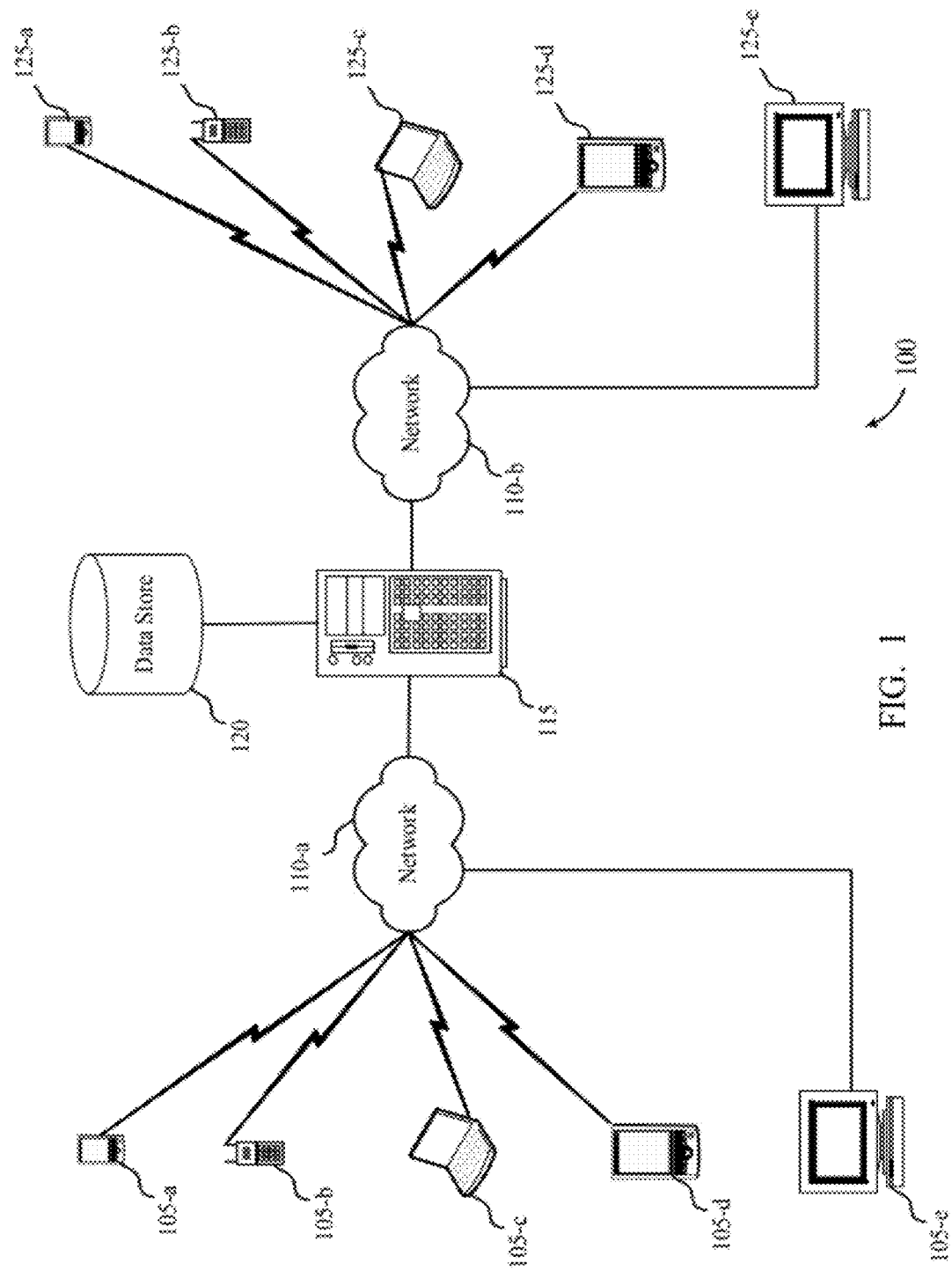
FIG. 1 is a block diagram of a system including components configured according to various embodiments of the invention.

Systems, devices, methods, and software are described for the creation of commentary on multimedia and other information content. In one set of embodiments, shown in FIG. 1, a system 100 includes input devices 105 (e.g., mobile device 105-*a*, mobile phone 105-*b*, laptop 105-*c*, tablet 105-*d*, computer 105-*e*, or other computing devices), networks 110, central server computer system 115, data store 120, and output devices 125 (e.g., mobile device 125-*a*, mobile phone 125-*b*, laptop 125-*c*, tablet 125-*d*, computer 125-*e*, or other computing devices). Each of these components may be in communication with each other, directly or indirectly.

Time, screen, and object location-specific comments may be created for multimedia and other information content. A user interface of an input device 105 allows a commentator to generate a comment, associated with a time code, for example, relating to the content (which, for purposes of this disclosure, may include movie, TV show, Internet and other video, book, article, song or other audio recording, photograph or other image, commercial advertisement, video game, immersive media, augmented or artificial reality media, the content contained in a comment, or other displayed content). The commentator may identify a screen location with the comment. The screen location may be modified or further defined as necessary to allow it to register a location within a 3D viewing environment. This created comment and associated screen location may be viewable to others watching the content in real time, or on a delayed basis. By using a time code, modified time code, or other locator or combination of locators as an external reference, along with a screen location, the comment need not actually be inserted into the multimedia, but may be called up from remote servers as the user reaches the applicable point. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof The comment may be stored locally (at the device 105, set-top box, or other storage device), or may be transmitted to the central server computer system 115 for cataloging and storage in data store 120. The central server computer system 115 may be made up of one or more server computers, workstations, web servers, or other suitable computing devices. The central server computer system 115 may be a cable or satellite headend. The central server computer system 115 may be fully located within a single facility or distributed geographically, in which case a network may be used to integrate different components.

Data store 120 may be a single database, or may be made up of any number of separate and distinct databases. The data store 120 may include one, or more, relational databases or components of relational databases (e.g., tables), object databases, or components of object databases, spreadsheets, text files, internal software lists, or any other type of data structure suitable for storing data. Thus, it should be appreciated that a data store 120 may each be multiple data storages (of the same or different type), or may share a common data storage with other data stores. Although in some embodiments the data store 120 may be distinct from a central server computer system 115, in other embodiments it may be integrated therein to varying degrees. The created commentary may be integrated into the underlying multimedia or other information content, or may be stand-alone content to be leveraged with technology allowing the time stamps to sync with the content as it is played.

The user may be alerted to the existence of a comment during playback of the content by the appearance of a viewing pane or a screen location or screen area-specific icon that can be touched or clicked on output device 125, to reveal its contents. In other examples, the content and commentary may be separated. Users may tailor their experience by selecting certain commentators, types of commentators, types of comments, and/or screen locations.

The components of the system 100 may be directly connected, or may be connected via a network 110 which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

The following description describes various aspects and options for the system. In the discussion below, the comments may be referred to as comments. Comments, as used herein, are to be interpreted very broadly. Comments may be created, and associated with screen locations, by users using input devices 105. Comments, and associated screen locations, may be viewed and controlled by users using output device 125. An input device 105 may be an output device 125, as well. Comments may be stored and organized in data store 120. Each feature is set forth for purposes of example only, and may be included or excluded in various embodiments.

A variety of interfaces may be used for comment creation. A commentator may use these interfaces to input a comment into a movie or other media item and to have that comment viewable (if the comment is marked public) to anyone else viewing or experiencing the media. By using a modified time code and screen location as an external reference, the comment may not actually be inserted into the media or into any metadata, but may be called up from a remote server as a viewer reaches that point in the media. There may be an uninterrupted feed by anticipating and pre-loading any upcoming comments. The user may be alerted to the existence of a comment during media playback by the appearance of a comment icon on the screen that can be touched or clicked to reveal its contents.

There are a variety of grid- or coordinate-based architectures that may be employed for screen location input and viewing. Alternatively, objects or images may be selected within an image. A variety of techniques are known in the art to select objects in an image based on color, brightness, and/or deviations. Shrink or expand controls may be used for object selection, as well. Within both 2D and 3D environments objects may be selected using techniques that may, for example, allow a user to select and associate a comment with a figure that is blocked by another object at the desired moment of comment insertion. This may be handled, for example, via a system that allows the user to scrub forward or back, select the figure, and return to the desired comment insertion point. In 3D environments, a comment location may be defined by elements particular to the 3D environment, such as a view pane within the image that is a certain apparent distance from the camera, or a region associated with a specific depth of field. A comment location may be similarly defined in 2D and 3D light field photography and video, and in such examples comment delivery may be based on a user's access to certain fields of view or focus. A comment location may be defined in non-visual media such as music by way of visualizations that may, for example, allow a comment to be placed in a particular tonal area or in an area representing a particular instrument. For playback, a variety of techniques may be used to indicate that comments are in a specific location. An icon may be shown for each comment, or an icon can be shown with different transparencies to illustrate the number of comments. Objects may be controlled to glow, shimmer, or have different color features when comments are made. Objects not currently in view because they are blocked may be estimated or interpolated to show their approximate location and allow them to indicate their relevance to an associated comment. Users may control this so they can set the noise level for given content.

Figure 2A:
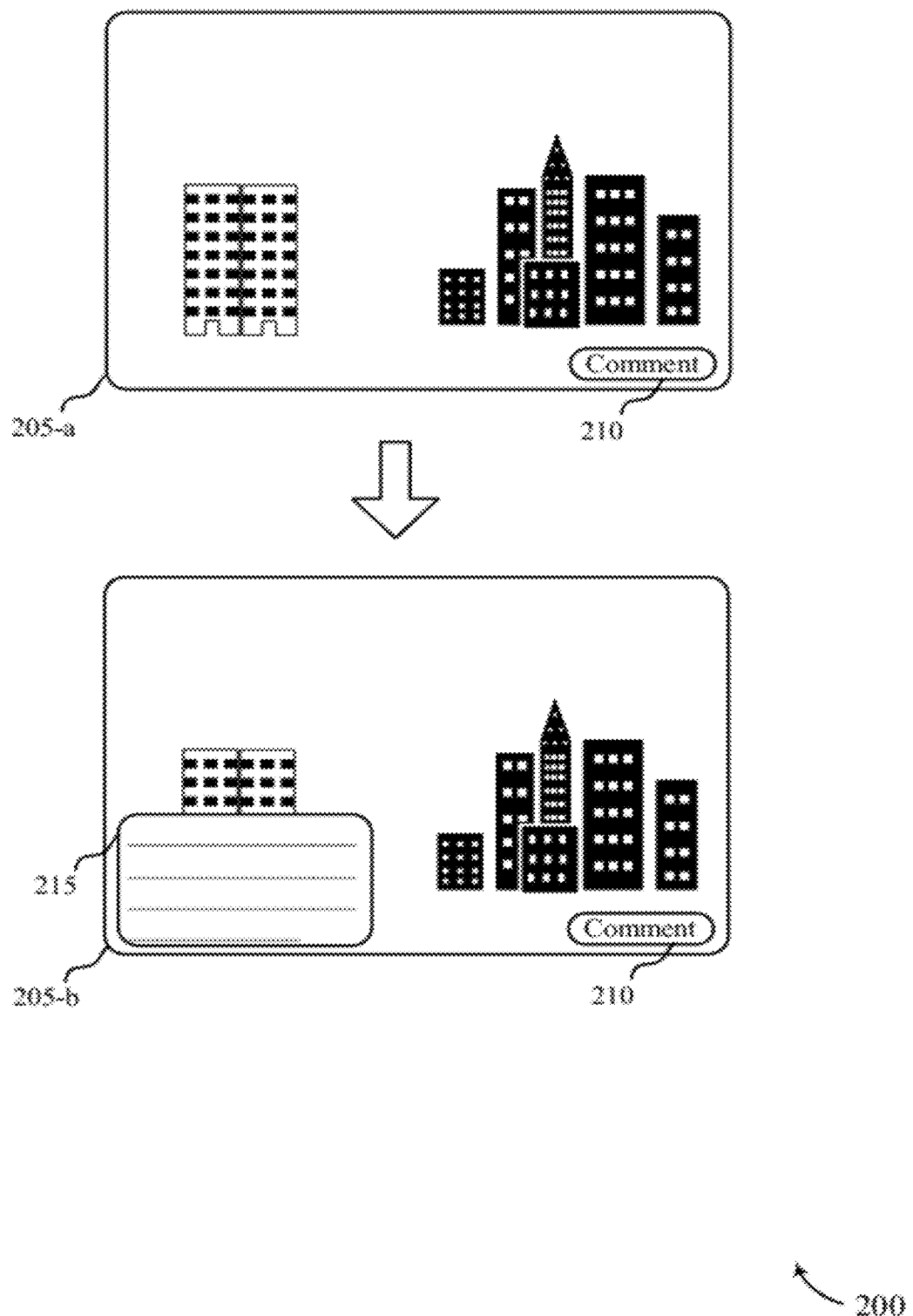
FIG. 2A is a block diagram of an example display according to various embodiments of the invention.

Thus, in one embodiment, there may simply be a time marker, screen location indicator, and associated text for a given piece of content. This may be stored separately and independently from the underlying content. FIG. 2A illustrates an example block diagram 200 of a display 205 with an interface for making comments. The display 205 may be on, or integrated with, a mobile device, mobile phone, laptop, tablet, computer, television, head-mounted display, remote control, or any number of other computing or viewing devices. The display 205 may be a touch screen or be controlled by user inputs into a remote, peripheral, or other mobile device. In the illustrated display 205, the locate comment icon 210 is overlaid on the content. However, in other embodiments, the interface may be independent or on another screen or window from the content.

Display 205-a illustrates the interface at Time1, with a locate comment icon 210. A user may click on, or otherwise select, the locate comment icon 210. Display 205-b illustrates the interface at Time2. A comment entry window 215 appears in response to the selection of the comment icon to allow the user to comment via text entry and select a screen location for the comment.

A user may set a screen indicator icon to display for a preset, or configurable, period. A user may set in and out points so that an entire scene can be referenced by the comment. This may allow the user to 'capture' the scene completely for reference and for playback or sharing. The user may set the icon to display at the beginning and end point, and to, optionally, display a scene marker during the span of the scene. This scene marker may be distinguishable from the standard comment marker.

As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments may be made by speaking, and the comment may be replayed during play of the underlying content. Alternatively, there may be speech to text conversion for making comments, and text to speech conversion for listening to comments. A user may insert a video of himself or herself with speech commentary, or other video may be inserted. Comments may be placed in specific locations on the display 205.

Comments from a number of users may be linked or otherwise integrated to create a comment set. A user may insert video, graphical, or audio overlays designed to be used simultaneously with media content rather than in separate or separable panes so that the media is augmented or fully joined by the message content. Comments may contain software applications that allow or trigger various actions within local or remote devices, software systems, or devices and systems within and outside the control of the user or the company or entity delivering these services. In this way, a comment can control local devices, for example, to reduce volume in one viewing pane or pause or slow the media, or provide other services to the user or other entities. Comments may be used, for example, to control or administer micropayment systems for media or premium commentary. Comments may contain a hyperlink to points outside the comment systems and they also may contain a link to or an association with a comment within the comment system or they may contain several potential links offering user a choice of links to media, media subunits and other comments in the form of a question, quiz, survey, or other device such as a software player that can link the comments and play the resulting media and meta-media. Comments and link-containing comments may be daisy chained, or linked in a hub-and-spoke or other such arrangement to provide unique ways for users to move through media or through portions of media.

Comments may be inserted as header comments designed to appear to subsequent users in a viewing pane associated with a point at the very beginning of the media and to contain general commentary about a piece of media not tied to a particular point on a timeline. Comments may contain messaging devices to allow the user, automatically or not, to send a message directly to another user or entity. Comments may include a device to exclude any user response from the public commentary or message stream so that it is viewable only as a private comment or message. Comments may have special status and functionality as super comments that allow individuals and entities, for example a wiki service, to capture and distill various comments in a single comment or an ordered collection of comments, which can then be further vetted and augmented. These super comments also may be filterable into collections of commentary that match a user's interests and sensibilities. Various comment types and combinations may be clearly marked with symbols, colors or other methods to alert users to their capabilities and limitations.

Figure 2B:
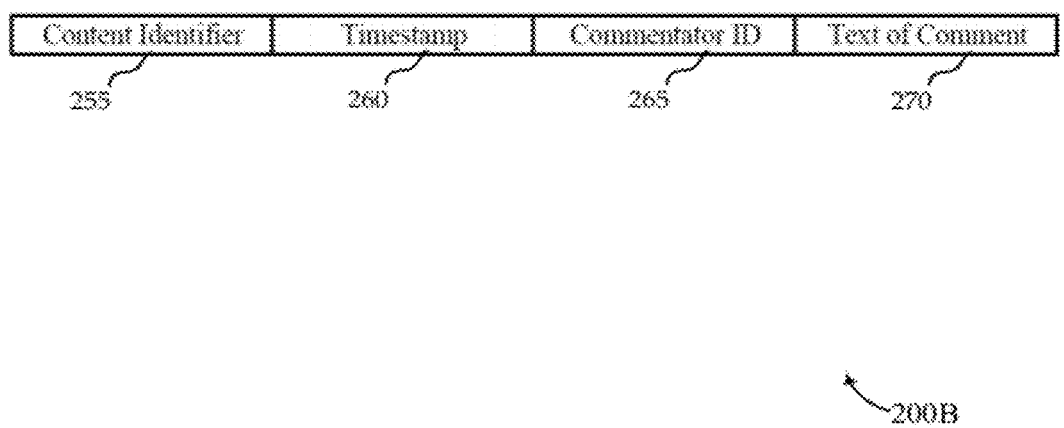
FIG. 2B is a block diagram of an example display according to various embodiments of the invention.

Referring to FIG. 2B, a block diagram 200B illustrates the type of information that may be transmitted from an input device 105 to a central server computer system 115, and stored in a data store 120 (e.g., in the system 100 of FIG. 1) when a comment is created. In the illustrated example, an input device may 105 may transmit a content identifier 255 (e.g., any number or alphanumeric character which identifies the media content to which the comment applies; a timestamp 260 indicating the time and/or location in the content where the comment was placed; a commentator ID 265 (e.g., any number or alphanumeric character which identifies the commentator); and the text of the comment 270. In one example, therefore, a data store 120 may catalog received comments using the above information.

Figure 3A:
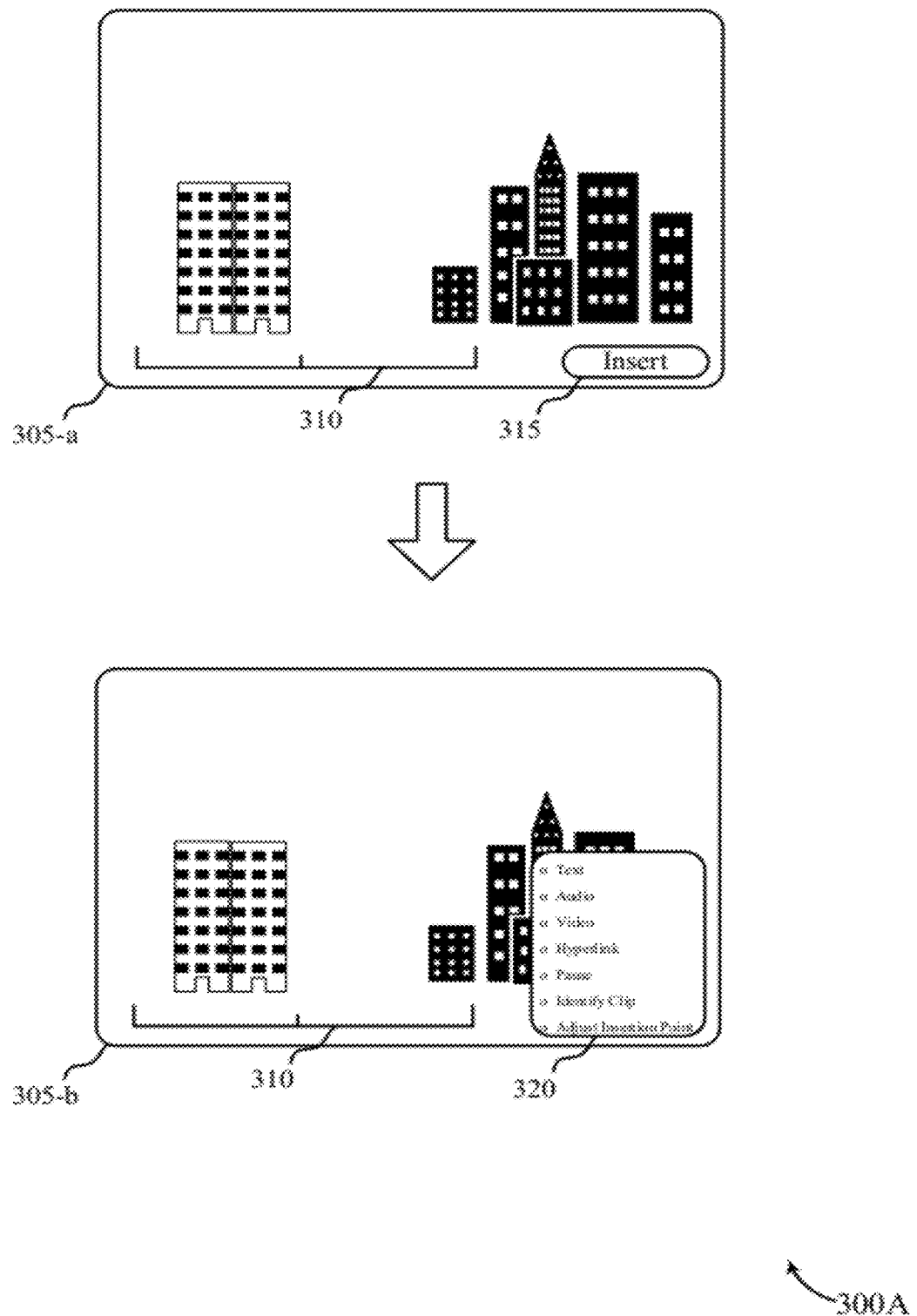
FIG. 3A is a block diagram of an example display according to various embodiments of the invention.

FIG. 3A illustrates an example block diagram 300A of a display 305 with an alternative interface for making comments. This display 305 may be an example of the display 205 described with reference to FIG. 2A. The display 305 may be on, or integrated with, a mobile device, mobile phone, laptop, tablet, computer, television, head-mounted display, remote control, or any number of other computing or viewing devices. The display 305 may be a touch screen or be controlled by user inputs into a remote, peripheral, or other mobile device. In the illustrated display 305, an insert icon 315 and scrubber control 310 are overlaid on the content. However, in other embodiments, the interface may be independent or on another screen or window from the content. The scrubber control 310 allows a user to control the underlying media, control the insertion of comments, set the timing of comment display, set the duration of the media subunits captured by the comment, zoom into the media time line, and other functions.

Display 305-a illustrates the interface at Time1, with an insert icon 315 and scrubber control 310 overlaid on the content. A user may use the scrubber control 310 to identify the proper place for comment insertion, and then may click on, or otherwise select, the insert icon 315. Display 305-b illustrates the interface at Time2. A comment type window 320 appears in response to the selection of the insert icon 315 to allow the user to comment via text, audio, video, animation, or hyperlink or other methods, insert a pause, identify a clip from the content, and adjust the insertion point. In addition, the user can further select the "locate" option for the ability to associate the selected option (e.g., text, audio, video, animation, or hyperlink) with a specific screen location.

Figure 3B:
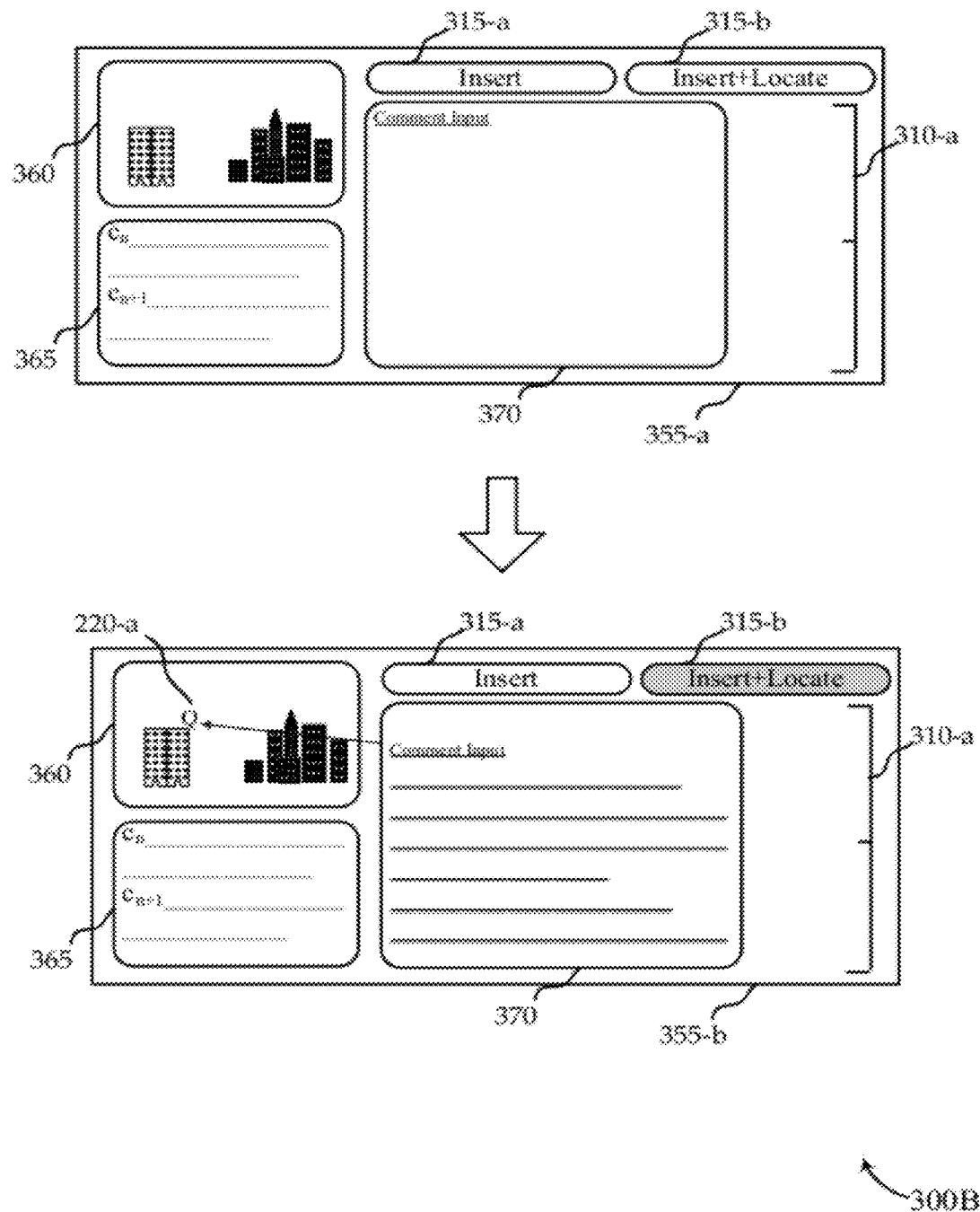
FIG. 3B is a block diagram of an example display according to various embodiments of the invention.

FIG. 3B is a block diagram 300B of a display 355 with an alternative interface for making comments. This display 355 may be an example of the display 205 described with reference to FIG. 2A. The display 355 may be on, or integrated with, a mobile device, mobile phone, laptop, tablet, computer, television, head-mounted display, remote control, or any number of other computing or viewing devices. The display 355 may be a touch screen or be controlled by user inputs into a remote, peripheral, or other mobile device. In the illustrated display 355, an insert icon 315-a, insert and locate icon 315-b, scrubber control 310-a, content window 360, comment stream from other commentators 365, and comment entry window 370 are in different windows within the display 355. However, in other embodiments, each interface may be overlaid or integrated or on a screen, or some subset of this functionality may be on a different device.

Referring to the display 355-a at Time1, a user may use the scrubber control 310-a to identify the proper time for comment insertion, and then may click on, or otherwise select, the insert icon 315-a to insert a general (non location-specific) comment. The user may click on, or otherwise select, the insert and locate icon 315-b to insert a location specific comment. This display configuration allows a user to view the underlying content via content window 360 (and perhaps look at other location specific comments (not shown)). A user may view the comment stream 365 (perhaps screen location-specific comments or otherwise filtered), and input comments into the comment entry window 370. In some examples, comments from the comment stream 365 may be dragged and dropped into the comment entry window 370, or otherwise selected for a comment set or other use. There may be threaded discussions, or comments from others may be pulled in.

The display 355-b at Time2 illustrates an example of when a user has clicked on, or otherwise selected, the insert and locate icon 315-b to insert a location-specific comment. A location indicator 220-a (here marked by a "Q") shows the user selected screen location that will be associated with the comment.

The system architecture for location-specific comment creation and viewing may take on a variety of forms. In some examples, DVD, broadcast, or streaming content may be received on a computer, set top box, or television. A user interface control (e.g., the control functions of the configurations illustrated in FIG. 2A, 3A, or 3B) may be in the same screen, but distinct from the content (e.g., overlaid, or in separate windows) for either creating or viewing comments. The user interface control and the content may be on different devices. The user interface control may use various mechanisms to associate a timestamp and screen location with the entry of a comment. In different embodiments, the user interface control may be integrated with content to varying degrees. The control window may receive inputs via a remote control, mobile device, keyboard, or other peripheral. The user interface control may control underlying media content (i.e., pausing the underlying media content), or not, and the user interface control may convey the underlying content to other devices for viewing while retaining player control and other functions.

Time, screen location, and object-specific comments may be created for the content. A user interface control of an input device allows a user to generate a comment, associated with a time code and screen location. By using a time code and screen location indicator as an external reference, the comment need not actually be inserted into the multimedia. The user interface control may be generated locally or served from the central server computer system. A user interface control of an output device allows a user to view a comment associated with a time code and screen location.

In one example, the content stream and user interface control are independent and distinct from each other (even when both are on the same display). In other embodiments, the content stream and user interface control are overlaid or partially integrated, and the placement location of the icon for a comment may be overlaid on the screen itself. In still other embodiments, the content stream and user interface control are tightly integrated.

The term "screen location," and other like terms, are to be construed broadly. For example, instead of choosing a specific location on the screen, a user may select an object or area to be associated with a comment. By selecting an object (for example, a person), the comment may move with the object within the screen.

Figure 4:
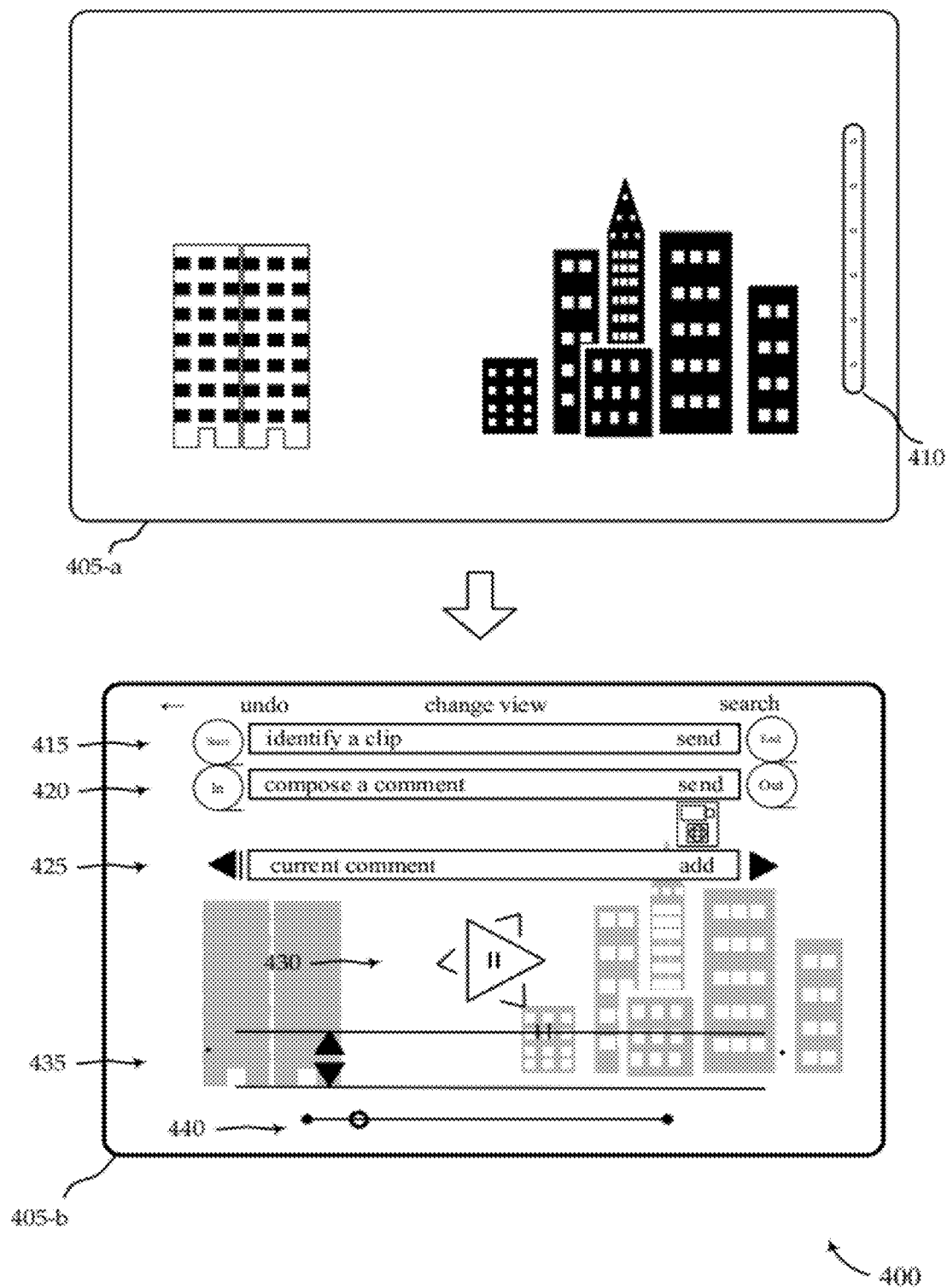
FIG. 4 is a block diagram of an example display according to various embodiments of the invention.

FIG. 4 illustrates an example block diagram 400 of a display 405 with an alternative graphical overlay system for selecting and identifying media content clips from a single interface or set of interfaces. This display 405 may be an example of the display 205 described with reference to FIG. 2A. The display 405 may be on, or integrated with, a mobile device, mobile phone, laptop, tablet, computer, television, head-mounted display, remote control, or any number of other computing or viewing devices. The display 405 may be a touch screen or be controlled by user inputs into a remote, peripheral, or other mobile device.

Display 405-a illustrates the interface at Time1, with an array of circles 410 (which may be referred to as category beacons) overlaid on the content. These beacons 410 may each represent a type of comment or a category, or a comment source or source category and each beacon may light up as the video passes a point at which a comment has been inserted. If a beacon 410 is pressed and held, the comments filtered by category may be shown. The beacons 410 may show a steady glow for comments that capture a media clip or subunit, with increasing brightness when multiple commentators have chosen the subunit or portions thereof. Regular comments show as brief pulses. By tapping, or clicking on, any of these buttons the category may be displayed. By pressing and holding, the user may be taken to a comment viewing window (not shown) that has been filtered by the category. The user can navigate sideways to other comment windows in other categories, and vertically to comment windows filtered by type or category of comment (e.g., "humorous," "cinematography," etc.). Certain aspect ratios (not shown) may allow some of the components illustrated to be displayed below the video field by user preference. Letterbox video may be shifted to the very top of the display to provide more room below. A window of comments may be displayed on one or more multiple lines, or in combination with other modular windows, such as a graphic to show traffic in the comment stream.

Display 405-b illustrates the interface at Time2. A user may select the option of having a graphical overlay appear, allowing the user to identify and comment on a custom clip from the media content being viewed. The graphical overlay may include an identify clip 415 set of features, a compose comment 420 set of features, and a current comment 425 set of features.

The identify clip 415 bar may be tapped and may be used to identify and save customized clips from the current media content being viewed. A user may tap the 'Start' button to identify the current location in the media content as the starting point for a new media content clip based on the current media content. The user may tap the 'End' button to identify the current location in the media content as the ending point for the new media content clip. Once the starting and ending points for the new clip have been identified, the user may select the 'send' feature to save the newly identified clip to temporary or permanent storage and/or to upload a selection or representation of the identified clip to a central server computer system for splicing with other clips. In certain examples, the user may be prompted to enter a new comment for association with the identified clip. Additionally or alternatively, one or more already known comments associated with the media content at or between the points identified by the clip may be selectively or automatically associated with the new media content clip. Alternately, the media content clip itself may not be saved or uploaded but may be delineated by markers such as time codes which are saved or uploaded and delivered to a subsequent user who may then be able to view the identical clip delivered by any means or source such as a streaming service that may or may not be the same streaming service that delivered the underlying media to the first user.

The compose comment 420 bar may be tapped, and the bar may expand to two lines and continue to expand as text is added. Below 'send,' on the second line is a pair of icons for audio and video recording of the comment. 'In' may be tapped to insert the comment at the current location in the media. It is not necessary to set an out point, but one can be set by scrubbing to the desired location in the media and pressing the 'out' button. The 'send' feature provides sending options such as 'send as a Tweet,' 'send to Facebook,' 'send as a message,' as well as an option to 'splice' this comment to another in a comment document, using a splice or linking comment to connect them.

The current comment 425 bar shows the most recent comment passed in the timeline. 'Current comment' may be tapped to view the entire comment. 'Current comment' may be pressed and held to go to a comment viewing window. A small vertical line to the left of the current comment shows when the current media has been captured within a comment clip, and gives a rough indication when more commentators also have chosen the current scene. The triangles at either end of the bar can be tapped to move forward and back through the comment timeline. 'Add' is a thumbs up, adding the comment to the user's set of comments that will be passed along to others.

In this example, there is also a unified play, pause, and reverse button 430. The button 430 may be designed to use a single control for media and other content windows. The default mode may be forward mode. A user may tap once to play, tap again to pause, tap again to play, and so on. From a paused state, a user may press and hold for 1 second (or other time period) to play in reverse (indicated, for example, by an audible sound, 1×). A user may tap to pause, tap to play in reverse, tap to pause. From a paused state in reverse mode, a user may press and hold for 1 second (or other time period) to play in forward mode. Tapping pause and play continues to advance media forward. A user may press and hold again for reverse mode. There may also be fast forward and reverse. In either forward or reverse mode, at play or reverse play speed, a user may press and hold the play button (e.g., holding for 1 second for 2× speed, holding for 2 seconds for 4× speed, and tapping to pause)

There may also be a split scrubber 435 that lets the user scan the media and the comment stream simultaneously, and to have control of each individually. To insert or view comments, a user slides a pair of triangle markers along a double timeline and finds a desired location. The top scrubber controls the media (when the media window is on top or to the left) and the bottom scrubber controls the comment stream below or to the right. The wide space between the lines controls them both simultaneously. Scrubber marks may disappear during finger (or cursor) swipe manipulation between the lines.

As the triangles are moved, they may change color or shading. This allows the user to be aware of a change in their position on the timeline when their movement would not otherwise be obvious. If the triangles are synchronized, the triangles may change color together, remaining the same color. If the triangles are out of synch, they may each change to different colors. This may help make the user aware that the user is out of synch when the distances on the timeline would not otherwise make it obvious.

With the split scrubber 435, a user may scan media and comments independently and quickly return the media to the place where it was paused. By tapping (or clicking) one or another of the relevant triangle markers, the user can choose to have the media resynchronized to the timeline location of either the media or the comments window. The user may also resynchronize by initiating play in the appropriate window. Aside from scanning and browsing, the split scrubber 435 may be used to change the insertion point or in/out points of a comment. The user may select a comment in the message window that he or she previously wrote, and after adjusting the media in the other window to the appropriate point, click the in or out icon, or click and drag the comment onto the media.

The split scrubber 435 also may be of use with other combinations of viewing windows, such as media and comment document windows, or comment and comment document windows. The split timeline may also be augmented with a third or fourth timeline to control multiple windows. The split scrubber 435 may also display the in and out points of the current comment if the comment pertains to a media clip (as opposed to a comment that has a single insertion point). It also may contain a space, for example, between the two lines, in which a finger swipe in either direction may advance the media to fine tune a location. It may contain points at either end that can be clicked or tapped to advance or reverse the media one frame at a time or advance or reverse the comment stream one comment at a time. These points may additionally be controlled by pressing and holding them to advance media in gradual acceleration up to 4×, for example. Fine control of this acceleration may be handled by a series of press/hold maneuvers, such as one press/hold for 1× speed and two press/holds for 2×. The split scrubber 435 also may be used to improve the speed of certain user operations when the system is unable to keep up with both media and commentary streams and when decoupling is desired.

A fine tune scrubber bar 440 may consist of a line within a window (horizontal or vertical) designed to focus finger swipe motions into a specific zone or to be manipulated by mouse control. It may be used without split scrubber 435 (e.g., it may be used in configurations in which use of a split scrubber 435 could lead to confusion or in which the split scrubber is too bulky). In some examples, a fine tune scrubber bar 440 may be used with each window with timeline-related elements, such as media and commentary, served by its own scrubber. Manipulation of one window may control both windows unless the synchronization of these windows is decoupled. Windows may be decoupled by pressing and holding one window while manipulating the scrubber of another. The windows can be resynchronized by initiating 'play' in either window, which synchronizes play to the chosen window. The disappearing scrub marker described herein may also have the capability of splitting into top and bottom halves so that this scrubber can be used as a less obtrusive split scrubber.

A fine tune scrubber bar 440 may be swiped from right to left, for example, to advance the media or commentary forward in the timeline. Rapid and repeated swiping may trigger the appearance of a marker indicating speed, such as 2× or 4×. It may also trigger the appearance of a scrub marker that shows progress along a timeline. When these markers appear, it may be a signal to the user to stop swiping and allow the content to continue at that speed to a desired point, or manipulate the markers to move a greater distance. A tap may again pause the content so that it can be fine-tuned by finger swipe. Pressing and holding a midpoint of the line may also trigger the display of the scrub marker and allow it to be manipulated to move greater distances in the timeline and to its beginning or end. This marker may disappear when the user makes further fine tune swiping motions. Tapping either end of the line may allow the user to advance frame by frame or comment by comment depending on the window. Pressing and holding one end of the line may increase scrubbing speed by successive increments, accelerating the speed from 2× to 4×, for example. This may work whether or not the scrub marker is visible, though it may also cause the scrub marker to appear so the user is aware of motion in the timeline. Releasing this may cause the window's content to pause again, or it may continue at that speed until the window is tapped to pause it. Further swiping may return the user to fine adjustments.

This scrubber bar 440 also may show fine movement in the disappearing scrub marker(s) by changing the color of the marker and the marker halves in the same manner as the split scrubber. These scrub markers may also be manipulated in the manner of the split scrubber above to decouple media from other windows and, by pressing and holding one or the other, resynchronizing to the timeline of the desired window.

There may also be browse scrubber functionality. Browse mode may be activated by pressing and holding a point in the media or comment window. Both may pause as soon as one is touched. Now either window may be manipulated by horizontal finger swipes to scrub the media and the comment stream forward and reverse. Rapid swiping in one direction (e.g., three times) may increase the speed of scrubbing and trigger the display of an optional simple scrubber bar and marker that can be manipulated to move greater distances in the timeline. If the optional simple scrubber bar is not manipulated, it may disappear after a short interval. If it is manipulated, once a finger is lifted from the scrubber, it may disappear and finger swiping may be automatically reactivated. While this swiping tool may default to simultaneous and synchronized viewing of both windows, the windows may be decoupled by manipulating one window with a swipe while pressing and holding the other. Once decoupled, the held window no longer needs to be held, and it stays in its position in the timeline.

In browse mode, there may be one screen anchored in a position in the timeline if the user hopes to return both windows to this original location to continue a viewing session. When it is time to resynchronize, the user can press and hold the window that is currently at the desired location, and the windows are synched. This mirrors a similar operation on the split scrubber in which the windows are resynchronized by pressing and holding the triangle marker associated with the window that is in the desired timeline position. If a user mistakenly presses the wrong window, the undo command may return the windows to their previous positions. The interface also may contain a command that can return the media to its previous viewing position(s) in case many user actions have transpired since the viewing session was interrupted. This command may be a second tier option of the undo command.

Browse mode may also allow the user to manipulate the media and comment screens vertically. Vertical strokes in the media window may move through other media in the queue or its sub-queues or through other comment projects underway. Pressing and holding points at the top and bottom edges of the window may move through sub-queues and other of these categories. This vertical movement may be helpful when the user is working across media to link scenes, create timeline-independent comment sets, build annotated music playlists, or create other commentary/media documents. It also allows a user to switch gears and enjoy other media.

The comment window may continue to display commentary from the first media until the user presses and holds the media window to synch commentary to that media and location on the timeline. Vertical strokes in the comment window move the window through the current list of comments arranged in timeline order, and each comment is expandable with a tap. Pressing and holding points at the top and bottom edges of the window may move through categories and classes of commentary so the user can view comments on a certain topic or of a certain type, such as humorous. Vertical movement in the comment window may be used in conjunction with horizontal movement to find a category (vertical movement to 'acting') and then move horizontally to select a type of comment, such as humorous, to display humorous comments about the acting. In windows or operations that benefit from diagonal movement, such as forms of a comment document builder, finger swipes can move screen objects diagonally and may move through matrices diagonally as well. Matrices and other mapping devices may also be viewed and navigated via other constructs in a 3D or simulated 3D environment, and the element of movement through time may add a fourth dimension to this navigation.

Browse mode may be further augmented with controls that allow the user to tap the edges of a viewing window to control incremental movements. In the media window, for example, a tap to the right edge (or a specifically marked spot on the edge) may advance the media one frame. In the message window, a similar tap may advance the comment stream by one comment. Taps on the top and bottom edges may advance the media window through the queue or sub-queues, and move the comment window through the comment categories. Pressing and holding these edges or marks may move the material in the window to its beginning or end point, such as the end of a media. Finger swiping may be augmented or substituted by comparable mousing controls, such as clicking and dragging within a control bar, or with eye movements, such as two rapid glances toward one edge of the screen when a specific viewing window is selected.

FIG. 5 is a block diagram 500 of an example display 505-*a* which may be used to assemble separately identified clips into a single composite media object, referred to as meta-media. The display 505-*a* may allow the user of an input device to browse custom media content clips created by the user and/or other media items available to the user. The user may select a number of clips or other media items to splice together with custom commentary into meta-media which may then be uploaded to the central server computer system and distributed to other users.

Figure 5A:
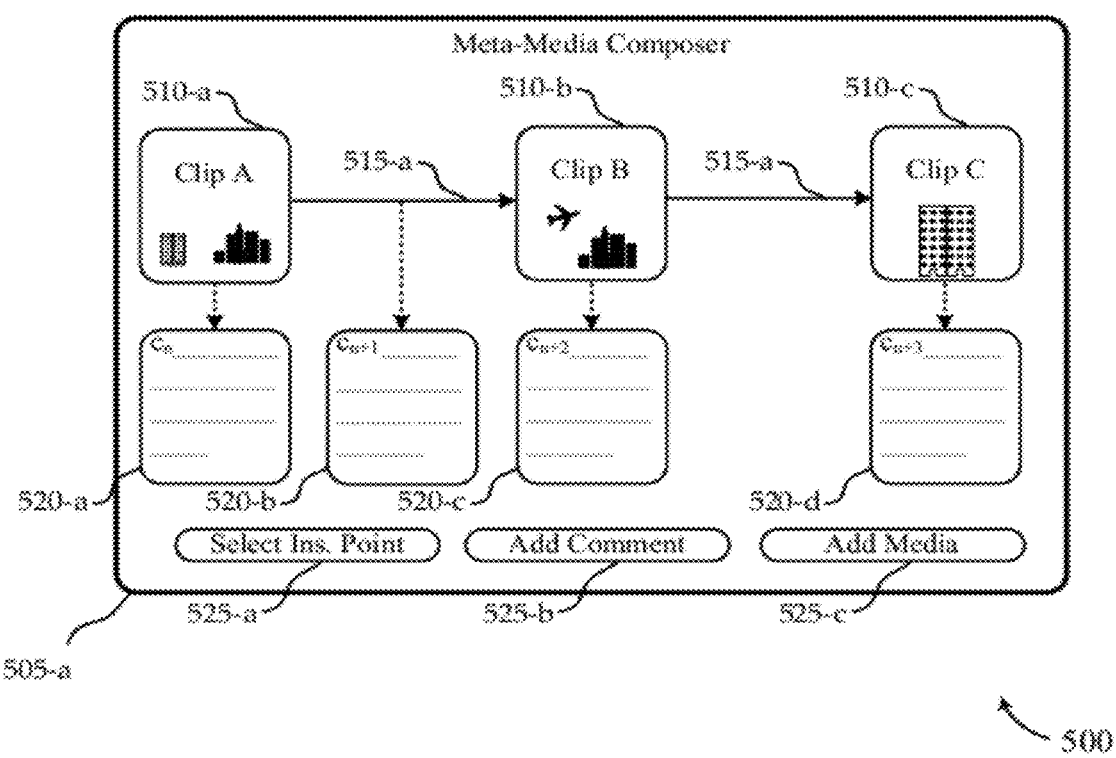
FIG. 5A is a block diagram of an example display according to various embodiments of the invention.

In the present example, the user has selected media content clip 510-*a*, media content clip 510-*b*, and media content clip 510-*c* for splicing together into a meta-media object. These media content clips may be identified portions from the same or different media content sources. As shown in FIG. 5A, clip 510-*a* is arranged to be played first, clip 510-*b* is arranged to be played second, and clip 510-*c* is arranged to be played third. The display 505-*a* may allow the playback sequence of the media content clips 510 using drag-and-drop or other functionality. The user may choose to associate comments 520 with individual clips 510 and with individual transitions 515 between the clips 510. In the present example, each of the clips has been associated with a comment 520, and the transition between clip 510-*a* and clip 510-*b* has also been associated with a comment 520. In additional or alternative examples, a media content clip 510 or transition 515 may be associated with multiple comments 520 or with no comments 520 at all.

A user may select portions of the content as clips. Clips may be linked in a 'splice' daisy chain or other configuration. A splice may contain any form of commentary, or none at all. The clips may be linked in a simple chain, or there may be multiple splice options (decision points to give users a chance set a new course). The system 600 may also allow the user to splice one clip to several clips that all run (more or less) simultaneously. This would create a condition to allow them to be mashed up using separate tracks overlaid on one another. To a user, the interface may look like a standard multi-track editing tool, but behind the scenes all the editing parameters may be contained in these splices (audio levels, clip start and stop times relative to the other clips, video effects and placement, pans, zooms . . . ). Thus, a splice may be a simple link between two media clips. It may contain a comment, or not, and it may be encoded with identifiers for each of the clips it connects. A splice may be a link with multiple options going forward, a decision point, so users can choose among various paths. Or a splice may be a link with multiple clips going forward, which may be presented to a viewer simultaneously, and that may be daisy chained with other splices.

The icons 525 at the bottom of the display 505-a may be used during the creation and organization of the meta-media object. The select insertion point icon 525-a may allow the user to identify a point during the playback sequence to insert a new comment or add a new clip or other media item. The add comment icon 525-b may allow the user to add a new comment for association with one of the clips 510 or a transition 525. The add media icon 525-c may allow the user to select and add additional media content clips 510 or other media items.

The completed meta-media object may include references (e.g., start and stop points and content identifiers) to the media content clips 510, the playback sequence for the media content clips 510, and the comments 520 associated with the media content clips 510 and/or transitions between the media content clips 510. When the completed meta-media object is played back on a device, the clips 510 may be played or shown according to the playback sequence, and indicators of comments 510 associated with individual clips 510 may be displayed when the individual clips are being played. If one or more comments 520 are associated with a transition 515 between clips 510, an indicator for each of those comments or the comments themselves may be automatically displayed at the appropriate transition 515.

Figure 5B:
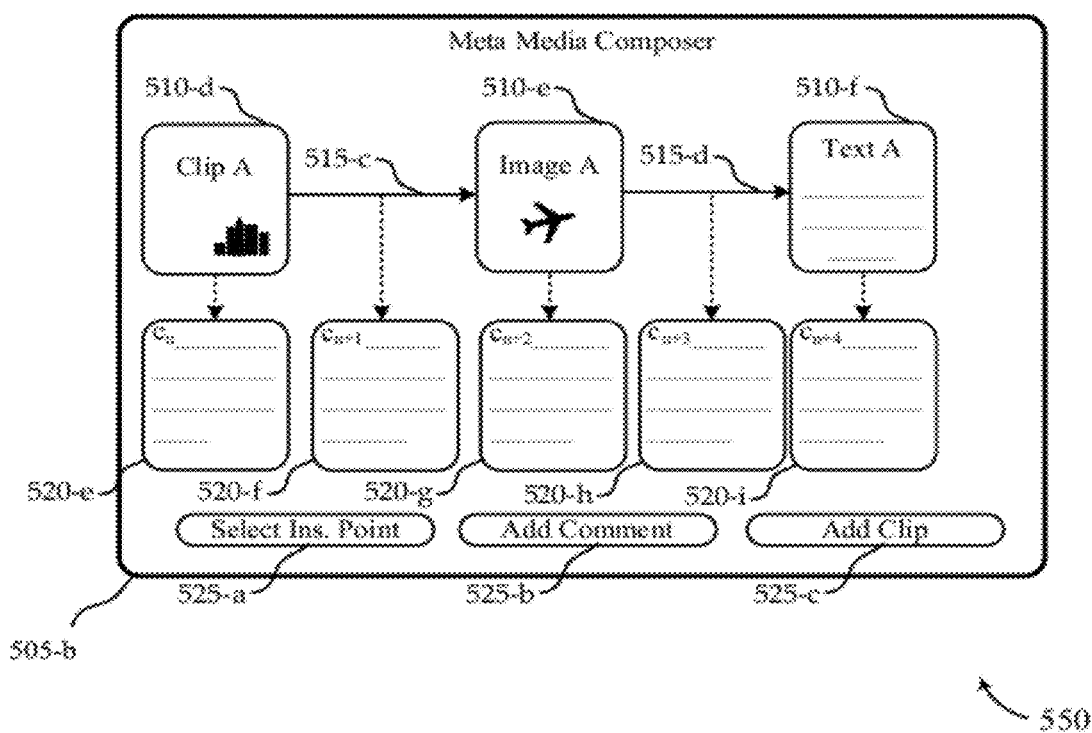
FIG. 5B is a block diagram of an example display according to various embodiments of the invention.

FIG. 5B is a block diagram 550 of another example display 505 for creating meta-media objects. In the present example, a meta-media object is created by associating a media content clip 510-d with an image 510-e and text, as determined by a playback sequence provided by the user. In the present example, comments 520 have been associated with each media content item 510 and each transition 525 between media content items 510.

Figure 6:
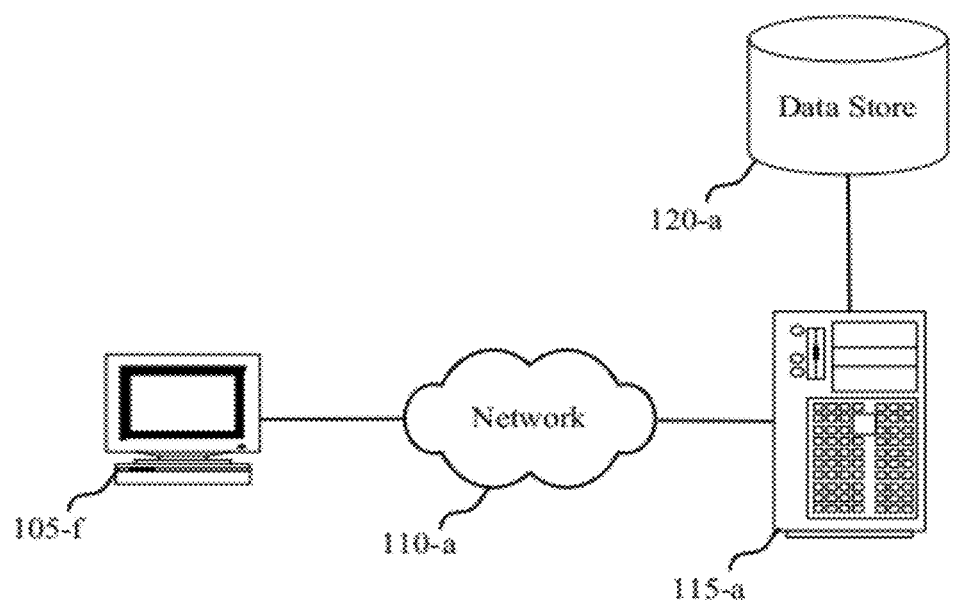
FIG. 6 is a block diagram of an example system including components configured according to various embodiments of the invention.

In one set of embodiments, shown in FIG. 6, a system 600 includes input device 105-f (e.g., a computer or television), network 110-a, central server computer system 115-a, and data store 120-a. Although in this case the underlying content is accessed from the central server computer system 115-a, the underlying content may alternatively be provided from a local source (e.g., DVD or other locally stored multimedia). This system 600 may be the system 100 of FIG. 1. Each of these components may be in communication with each other, directly or indirectly.

The central server computer system 115-a may stream, or otherwise transmit, video data (or other information data) to the input device 105-f This content may be accessed from data store 120-a. The user may view the content on the input device 105-f and select clips of the content for combination with other media items or clips in a meta-media object, as described above. The meta-media object may be transmitted from the input device 105-f to the central server computer system 115-a for storage at the data store 120-a and distribution to other users.

The system 600 may include an ability to manage micro-payments for media and for the meta-media it facilitates, thereby allowing content owners to be compensated and, additionally, to create custom payment regimes that can be communicated to the user and transacted. For example, payment requirements may be inserted into media as special comments, allocated with precision to handle price differences even among different scenes in a movie or among clips in a song, cross-referenced to the media's distribution source, and tallied for the user to accept or decline or opt for a higher level of access within a distribution environment. Payment may be required when a user attempts to use a media content clip in a meta-media object for distribution to others and/or when a user attempts to view a media content clip in a meta-media object created by another. In certain examples, the user may not be purchasing permanent rights to the underlying media content, but rather the user may be gaining one-time access to the media content via a streaming service. In some embodiments, the user may use a subscription service in which a fixed periodic cost permits the user to access a limited or unlimited amount of underlying media content from the streaming service.

There may be a method to track a user's viewing of small media clips and to assess micropayments from users to content owners or distributors by delivering information about what portions of a piece of media have been viewed or accessed and the duration of that viewing session. In one example, a specialized comment may be inserted into the 'header' area or other repository for information about the media item as a whole to describe a cost per time unit for clips of that media. Similar comments may be inserted elsewhere in the media if costs per time unit vary within that media. These internal comments may be inserted in pairs so that they describe in/out points. That information can then be drawn from the comment by the local application to provide the user with cost estimates in advance. The user can set cost thresholds that raise flags but otherwise allow this information to be gathered and tallied behind the scenes. In certain examples, a user may not be charged upfront to view price-protected media content, but the tracked media content usage of the user may be tallied for a service that periodically bills the user for a subscription service, an 'a la carte' service, or a system that combines subscription and 'a la carte' options for media content streaming.

Thus, there may be a method for delivering to a central server computer system (and in turn to content owners and distributors) information about what clips have been viewed. There may be an automated system of query and response that allows a user to acknowledge and agree to micropayment charges before viewing a clip or using the clip in a meta-media object, or to agree to charges on a less granular basis.

Figure 7:
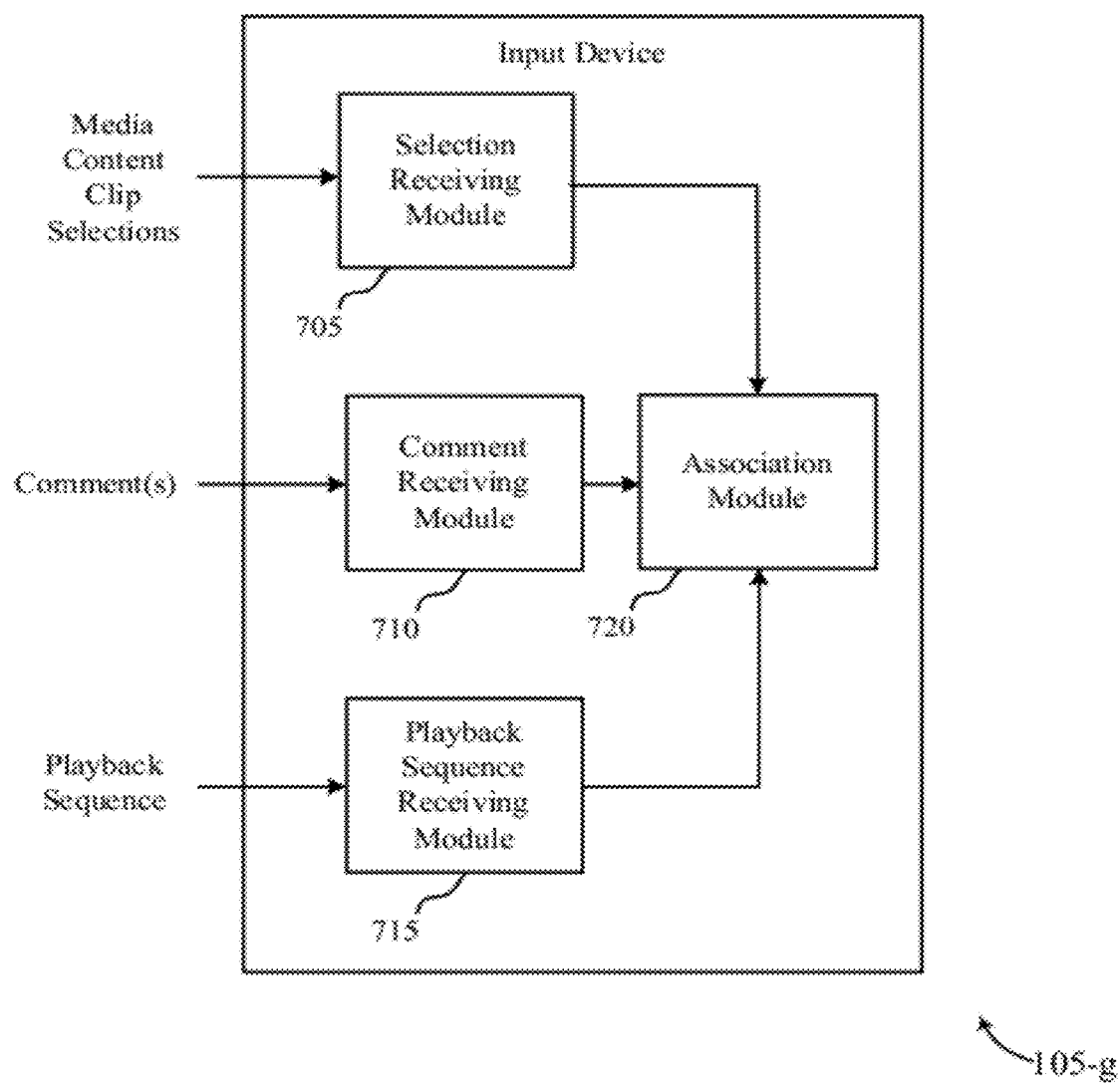
FIG. 7 is a block diagram of an example input device according to various embodiments of the invention.

In certain examples, information aggregated from the clip selections by multiple users may be mapped or otherwise analyzed to show popularity, associative linkages and other information that may have use in the creation and manipulation of media sub-units by users and automated systems. Such analysis may be used, for example, in automated systems to create meta-media or to micro-price media sub-units FIG. 7 illustrates a block diagram of an example of an input device 105-g according to various aspects of the principles described herein. The input device 105-g may be an example of one or more of the input devices 105 described above with reference to FIG. 1 or 6. The input device 105-g of the present example includes a selection receiving module 705, a comment receiving module 710, a playback sequence receiving module 715, and an association module 720. Each of these components may be in communication, directly or indirectly.

The selection receiving module 705 may be configured to receive a number of selections of media content clips and/or other media items for inclusion in a meta-media object. Each media content clip may be identified, for example, by a media content identifier, a start point, and an end point. This identifying information may be received at the selection receiving module 705 instead of the actual media content clips. The comment receiving module 710 may be configured to receive a comment authored or otherwise generated by a user of the input device 105-g. The comment receiving module 710 may receive, for example, at least one comment for association with one or more of the media content clips or media content items received at the selection receiving module 705. Additionally or alternatively, the comment receiving module 710 may receive one or more comments associated with a transition between media content clips and/or media content items received at the selection receiving module 705.

The playback sequence receiving module 715 may be configured to receive a playback sequence for the media content clips and/or other media content items received at the selection receiving module 705. This playback sequence may be received using a graphical user interface, such as the display 505 described above with reference to FIG. 5A or 5B. Additionally or alternatively, other methods of receiving the playback sequence may be used.

The association module 720 may be configured to associate the received media content clips and/or other types of media content items with each other into a meta-media object according to the received playback sequence. The association module 720 may also associate the received comments 710 with the various media content clips, items, and/or transitions for which the comments are intended. Once associated, the meta-media object may be transmitted to a central server computer system (e.g., the central server computer system 115 of FIG. 1, or 6) for storage at a data store 120.

In the example of a meta-media object made up of media content clip selections and comments, the meta-media object may be transmitted to the central server computer system in the form of a content identifier, start point, and stop point, for each media content clip in the meta-media object; the content of each comment in the meta-media object; the received playback sequence; and association data linking each comment to either one of the media content clips or a transition between two media content clips. In certain examples, time codes may be generated for the start and stop points of the media content clips at the input device 105-g, and the start and stop points may be transmitted to the central server computer system in the form of the time codes.

In certain examples, the input device 105-g may further be configured to determine a price for media content clips selected for the meta-media object. For example, if a user wishes to splice a first media content clip and a second media content clip into a meta-media object, the input device may communicate with a central server computer system to determine a price for each clip. The price may cover licensing, royalties, and other fees for copyrighted material and services. In certain examples, the price for certain free or user-generated clips may be zero. The price for a certain clip may be less than a price associated with the entire media content from which the clip is taken. The input device 105-g may be configured to prompt the user to purchase restricted clips before allowing the user to generate the meta-media object or transmit the meta-media object to the central server computer system for distribution to others. A meta-media object may only contain sufficient information to allow the clip to be created when streaming or other media is available, or it may also contain media clips or media clip echoes.

Figure 8A:
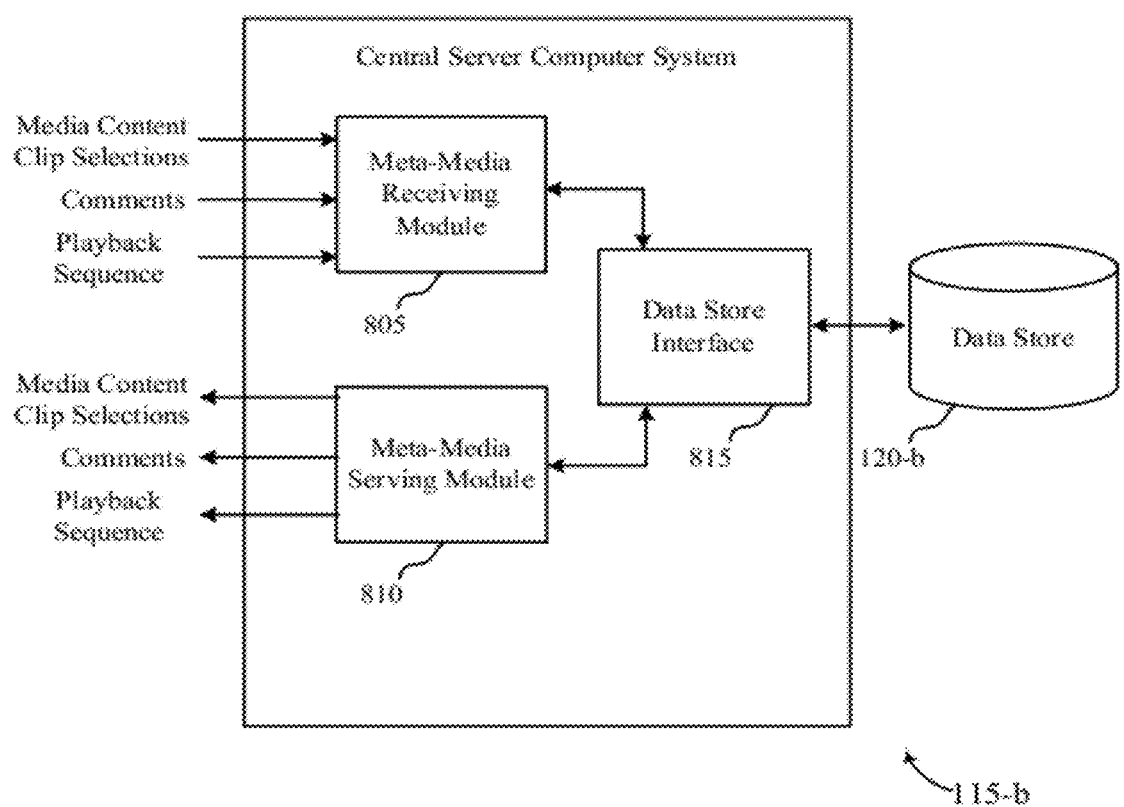
FIG. 8A is a block diagram of an example central server computer system according to various embodiments of the invention.

FIG. 8A illustrates a block diagram of an example central server computer system 115-b. The central server computer system 115-b of FIG. 8A may be an example of the central server computer system 115 of FIG. 1 or 6. The central server computer system 115-b of the present example includes a meta-media receiving module 805, a meta-media serving module 810, and a data store interface 810 configured to communicate with a data store 120-b. The data store 120-b may be an example of the data store 120 of FIG. 1 or 5.

The meta-media receiving module 805 may receive (e.g., from input devices 105 of FIG. 1 or 5), a meta-media object related to various articles of media content. In one example, the meta-media receiving module 805 may receive a meta-media object in the form a selection of a first media content clip, a first comment associated with the first media content clip, a selection of a second media content clip, a second comment associated with the second media content clip, and a playback sequence for the first media content clip and the second media content clip. In certain examples, the selection of each media content clip may include a first point and a second point during a related article of media content. In additional or alternative examples, the meta-media content object may also include one or more comments associated with a transition between the playback of the first media content clip and the second media content clip in the specified playback sequence.

The data store interface 815 may interact with the data store 120-b to store the received meta-media object at the data store 120-b by associating the first media content clip with the second media content clip according to the specified playback sequence. The data store 120-b may store each of the received comments in association with its corresponding media content clip or transition in the data store 120-b.

The meta-media serving module 810 may be configured to distribute meta-media objects from the data store 120-b to an output device (e.g., an output device 125 of FIG. 1) in conjunction with a request for the meta-media object from a user of the output device. The requested meta-media object may be transmitted to the output device in the form of the selected media content clips, the associated comments, and the specified playback sequence.

Figure 8B:
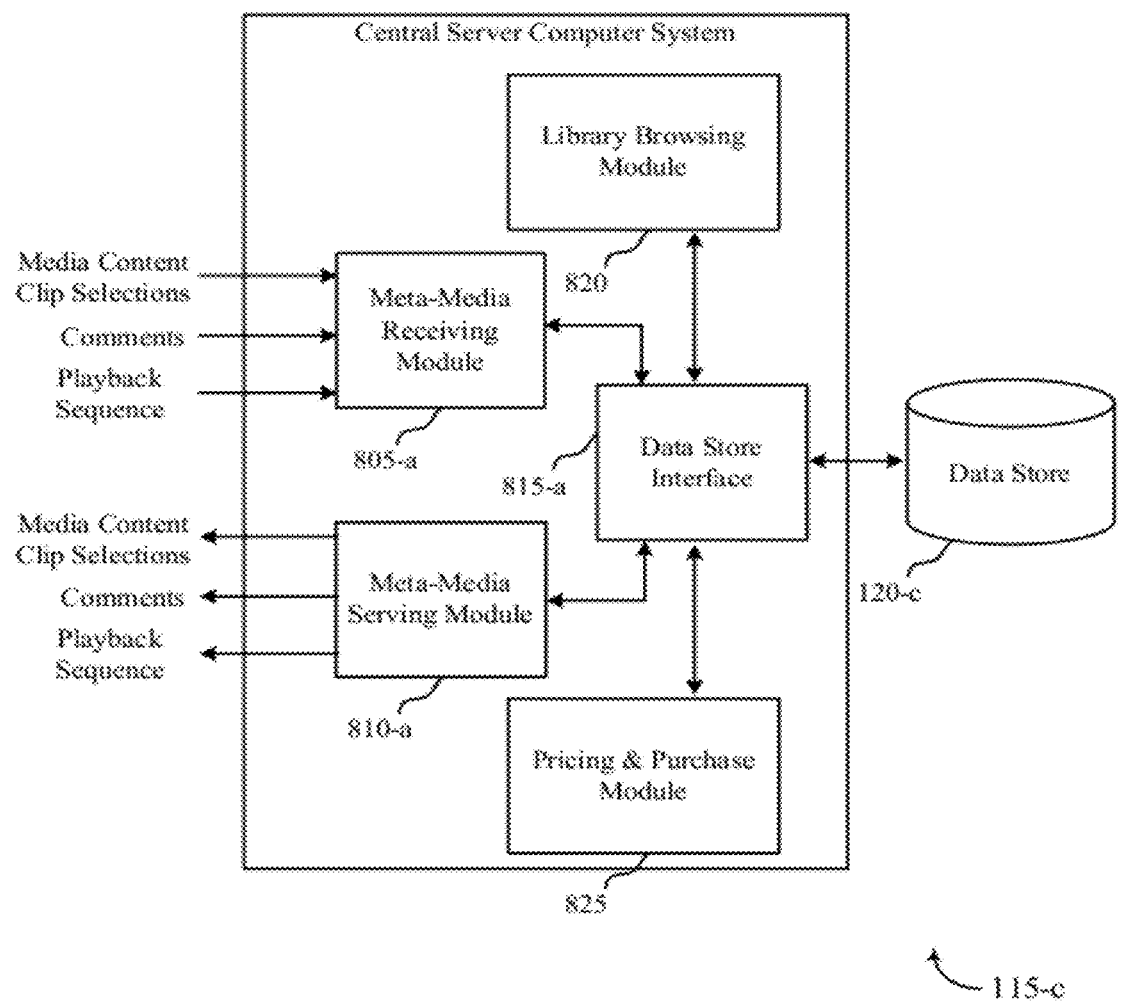
FIG. 8B is a block diagram of an example central server computer system according to various embodiments of the invention.

FIG. 8B illustrates an example diagram of certain components of another example central server computer system 115-c. The central server computer system 115-b of FIG. 8B may be an example of the central server computer system 115 of FIG. 1, 6, or 8A. Similar to the example of FIG. 8A, the central server computer system 115-c of the present example includes a meta-media receiving module 805-a, a comment meta-media serving module 810-a, and a data store interface 815-a configured to communicate with a comment data store 120-c.

The central server computer system 115-b of the FIG. 8B additionally includes a library browsing module 820 and a pricing and purchasing module 825. The library browsing module may communicate with an input device (e.g. input device 105 of FIG. 1, 6, or 7), allowing a user of the input device to browse available media content and select clips from the available media content for splicing together into a meta-media object.

The pricing and purchase module 825 may provide a price for each of the media content clips that the user of the input device requests for inclusion in a meta-media object. For example, if the user is creating a meta-media object from a first media content clip and a second media content clip, the pricing and purchasing module may provide a first price of the first media content clip and a second price of the second media content clip to the user, and prompt the user to complete a purchase transaction before allowing the selected clips to be selected for use in a meta-media object uploaded to the meta-media receiving module. Additionally or alternatively, a viewer of the meta-media objects may be charged. In such examples, the pricing and purchase module may communicate with an output device (e.g., output device 125 of FIG. 1) that has requested a meta-media object having a first media content clip and a second media content clip to provide the user of the output device with a first viewing price for the first media object clip and a second viewing price for the second media object clip. The meta-media serving module 810-*a* may condition transmission of the requested meta-media object to the output device on completion of a purchase transaction for the specified prices.

Figure 9:
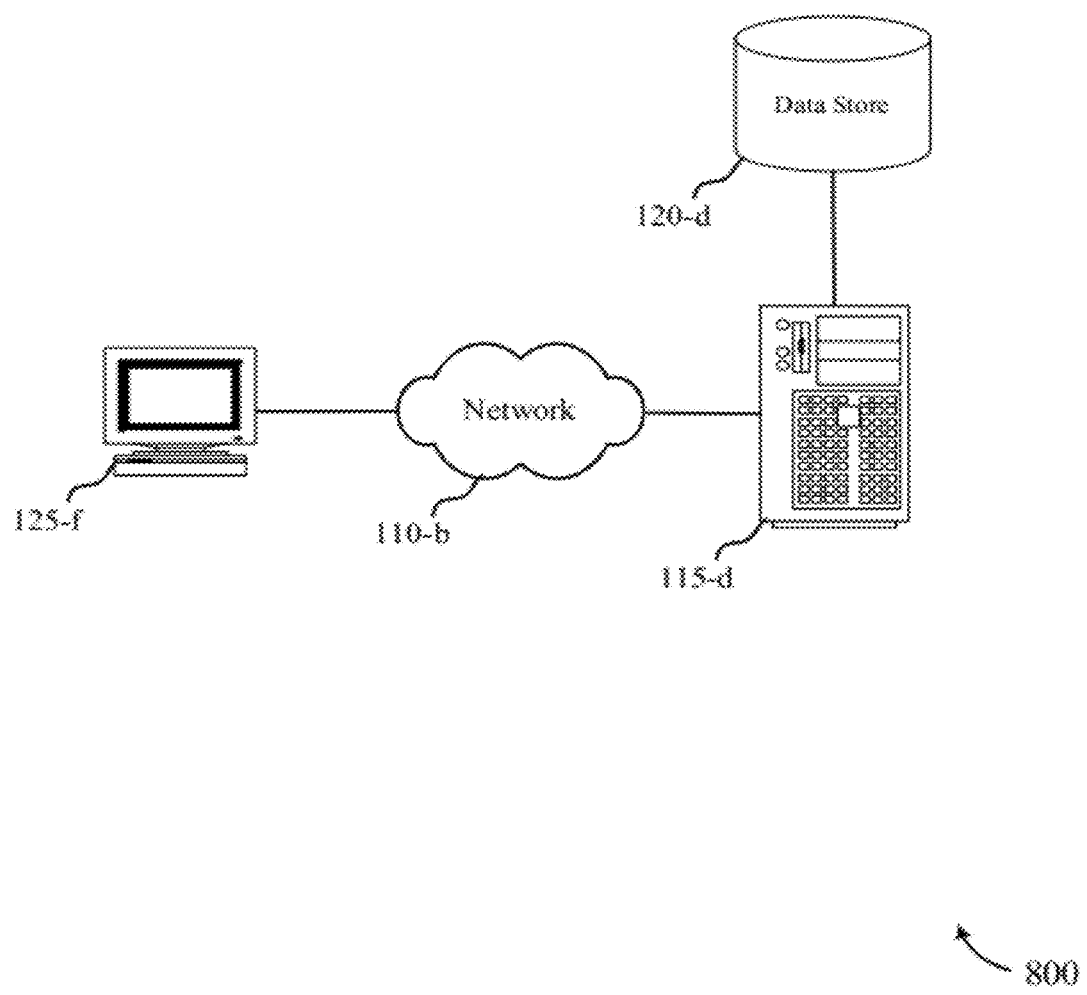
FIG. 9 is a block diagram of an example system according to various embodiments of the invention.

In one set of embodiments, shown in FIG. 9, a system 900 includes output device 125-*f* (e.g., a computer or television), network 110-*b*, central server computer system 115-*d*, and data store 120-*d*. This system 800 may an example of the system 100, 600, of FIG. 1 or 6. Each of these components may be in communication with each other, directly or indirectly.

The central server computer system 115-*d* may be an example of the central server computer system 115 described above with reference to FIG. 1 or 6. The central server computer system 115-*d* may stream, or otherwise transmit meta-media objects to the output device 125-*f*, along with the time-specific comments. The central server computer system 115-*d* may receive user preferences and selections for meta-media objects and data associated therewith, and access the selected information from the data store 120-*d*. The content (and comments) may be accessed from data store 120-*d*, or other sources.

In one example, the content stream from a received meta-media object and a user interface control are independent and distinct from each other (even when both are on the same display). In other embodiments, the content stream and user interface control are overlaid or partially integrated. In still other embodiments, the content stream and user interface control are tightly integrated. There are, therefore, a number of different options for various user interfaces that may be used to view the comment stream. In one example, there may be a comment pane that appears during viewing of a meta-media object, integrated therein. In another example, there may be separate windows for the content and comment panes, or in still other examples they may appear on separate devices.

A user interface may include additional configurations or advanced functionality. A comment pane may show only redacted comments, and a user may select comments to see the full text, or thread. Search tools may allow the user to find a term that appears in a comment, and separate search functions may allow a user to search for commentators based on name, ratings, and interests. There may be premium content, and advertisements. There may be user playback control for content.

The output device 125-*f* may include a variety of tools to filter comments. As noted, a more basic design may allow a user to select favorite commentators and friends, or highly rated comments or commentators. Each selected commentator's time specific comments (generated at different times) may be pulled into the comment stream, and displayed. In other examples, the comments and commentators may be selected automatically based on historic preferences. There may be comment count monitors and alerts, and different users may adjust their noise tolerance.

In some examples, the comment viewing pane may adjust automatically, as well as at user's discretion. In one example, there is an unobtrusive tab system to allow switching among various configurations. Users may have varying levels of review and ratings for commentators and comments. Users may flag comments and commentators who do not comply with standards.

Figure 10:
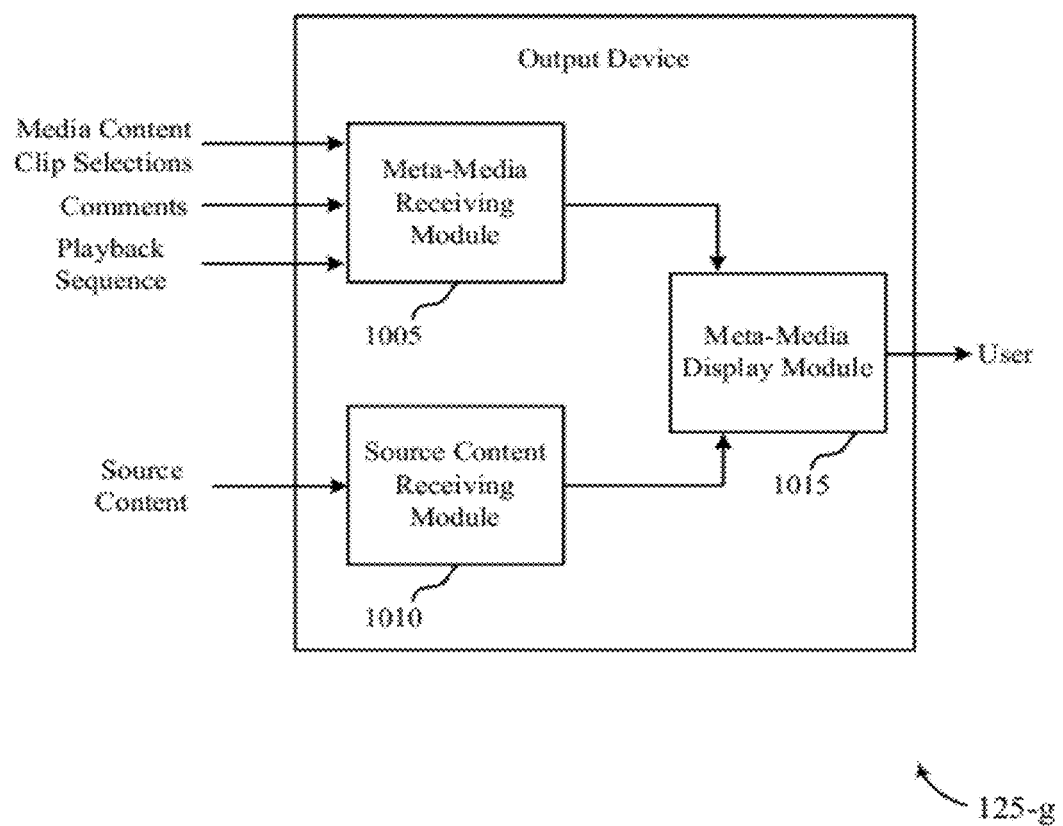
FIG. 10 is a block diagram of an example output device according to various embodiments of the invention.

FIG. 10 illustrates a block diagram of an example output device 125-*g*. The output device 125-*g* may be an example of the output device 125 described above with respect to FIG. 1 or 9. In certain examples, the same device may function as both an input device 105 and an output device 125. The output device 125-*g* of the present example includes a meta-media receiving module 1005, a source content receiving module 1010, and meta-media display module 915. Each of these components may be in communication, directly or indirectly.

The meta-media receiving module 1005 may receive meta-media objects from a central server computer system (e.g., the central server computer system 115 of FIG. 1, 6, 8A, 8B, or 9). In one example, a meta-media object may be received as a first media content clip, a first comment associated with the first media content clip, a second media content clip, a second comment associated with the second media content clip, and a playback sequence. The first media content clip may be received as a media content identifier, a first time code, and a second time code, and the second media content clip may be received as a media content identifier, a third time code, and a fourth time code. The time codes may correspond to start points and end points of the clips, respectively. In certain examples, one or more media content clips may be received as the actual source content of the clips.

The source content receiving module 1010 may receive the actual source content of the media content clip selections in the meta-media object. The source content may be received from the same central server computer system providing the meta-media object to the output device 125-*g*, or from a different central server computer system. As described above, in alternative examples, the source content for the media content clip selections may be received as part of the meta-media object transmitted to the meta-media receiving module 1005. In one example, a user subscribing to a streaming service may be able to view the same meta-media object as a user subscribing to another streaming service, as long as each user is able to stream the same underlying media content. Additionally or alternatively, certain users may access media on an 'a la carte' basis from various streaming media sources.

The meta-media display module 1015 may play the media content clips identified in the meta-media object based on the received playback sequence. In certain examples, the meta-media display module 1015 may display each media content clip in the meta-media object by identifying the underlying media content for the clip, identifying a start time code for the clip, identifying an ending time code for the clip, requesting a central server computer system to deliver source content corresponding to the identified clip at the source content receiving module 1010, and displaying the identified source content.

Comments associated with the meta-media object may be displayed during the playback of relevant portions of the meta-media object. For example, the meta-media display module 1015 may display to a user of the output device 125-*g* an indication of a first comment during playback of the first media content clip and an indication of a second comment during playback of the second media content clip. If a comment is associated with a transition between the playbacks of the media content clips, an indication of that comment may be displayed as the meta-media display module 1015 transitions from the playback of one media content clip to another media content clip.

In certain examples, the output device 125-*g* may be further configured to identify a price for one or more of the media content clips included in the meta-media object. For example, if a meta-media object includes a first media content clip and a second media content clip, the output device 125-*g* may receive a first price of the first media content clip and a second price of the second media content clip from a central server computer system and display the prices to a user of the output device. The price for a media content clip may be less than the price for viewing the entire underlying content from which the clip is derived. In these examples, the output device 125-*g* may be configured to condition playback of one or more of media content clips and/or the comments associated with the media content clips on payment of the prices associated with the media content clips.

Figure 11:
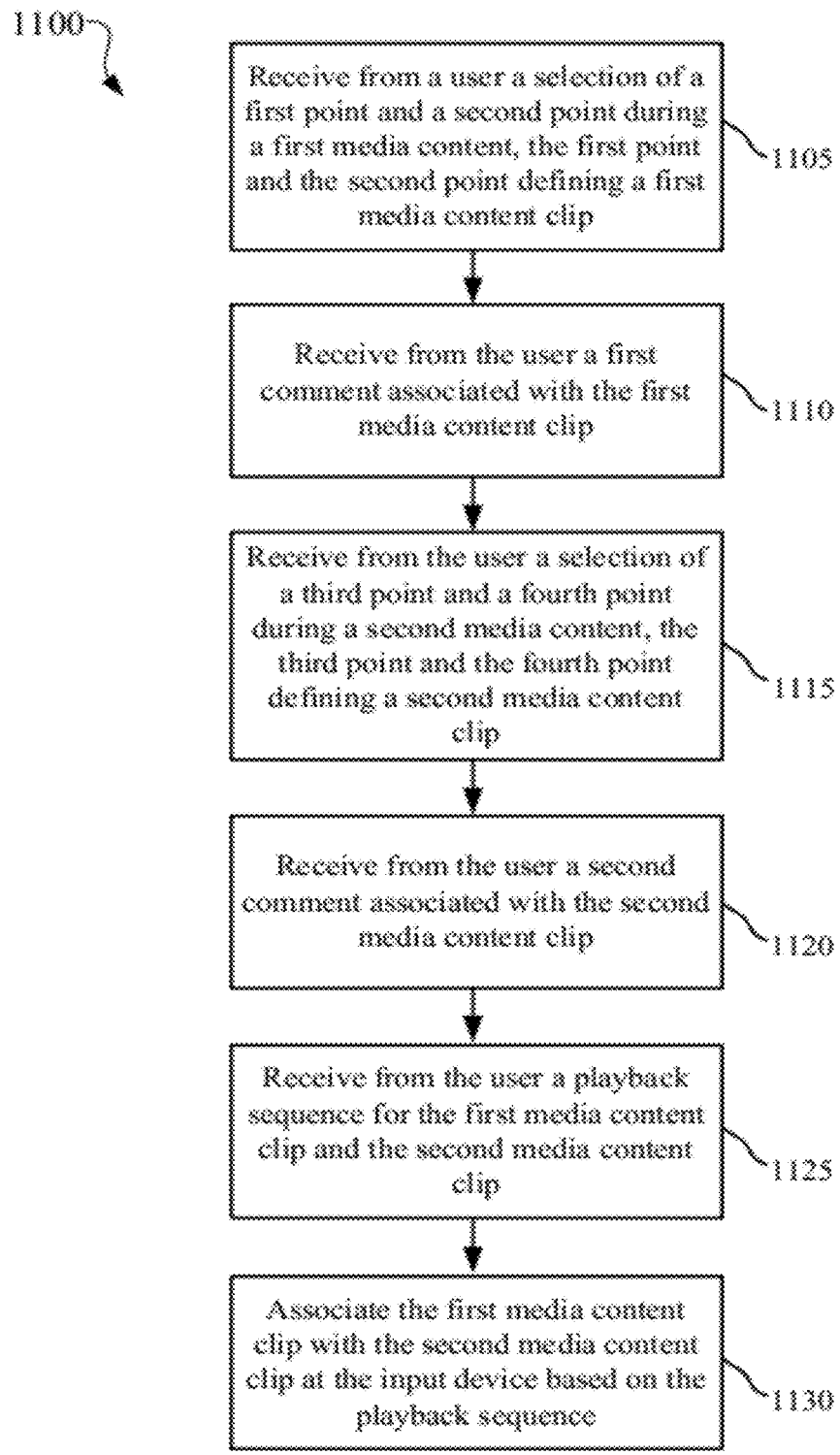
FIG. 11 is a flowchart diagram of an example method of associating comments with playback of media content according to various embodiments of the invention.

FIG. 11 is a flowchart diagram of an example method 1100 of associating comments with playback of media content. The method 1100 may be performed, for example, by the input device 105 described above with reference to FIG. 1, 6, or 7. At block 1105, a selection of a first point and a second point is received from a user at the input device. The first point and the second point may define a first media content clip. At block 1110, a comment associated with the first media content clip is received from the user at the input device.

At block 1115, a selection of a third point and a fourth point is received from the user at the input device. The third point and the fourth point may define a second media content clip. At block 1120, a second comment associated with the second media content clip is received from the user at the input device. At block 1125, a playback sequence for the first media content clip and the second media content clip is received from the user at the input device. At block 1130, the first media content clip is associated with the second media content clip at the input device based on the playback sequence.

Figure 12:
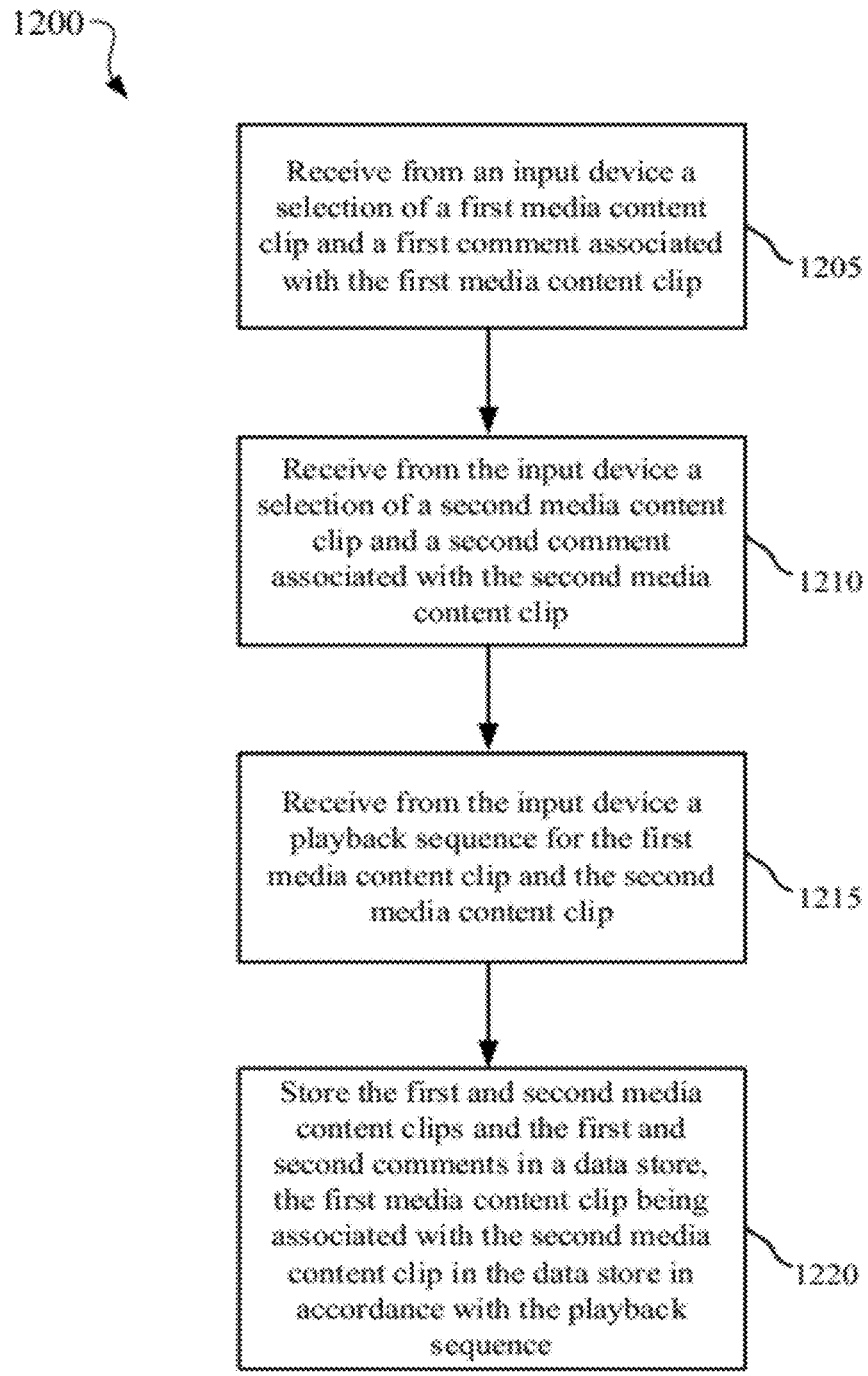
FIG. 12 is a flowchart diagram of an example method of associating comments with playback of media content according to various embodiments of the invention.

FIG. 12 is a flowchart diagram of an example method 1200 of associating comments with playback of media content. The method 1200 may be performed, for example, by the central server computer system 115 described above with reference to FIG. 1, 6, 8A, 8B, or 9. At block 1205, the central server computer system receives from an input device a selection of a first media content clip and a first comment associated with the first media content clip. The selection of the first media content clip may include a first point and a second point during a first media content.

At block 1210, the central server computer system receives from the input device a selection of a second media content clip and a second comment associated with the second media content clip. The selection of the second media content clip may include a third point and a fourth point during a second media content. At block 1215, a playback sequence for the first media content clip and the second media content clip is received from the input device. At block 1220, the first and second media content clips and the first and second comments are stored in a data store. The first media content clip is associated with the second media content clip at the data store in accordance with the received playback sequence.

Figure 13:
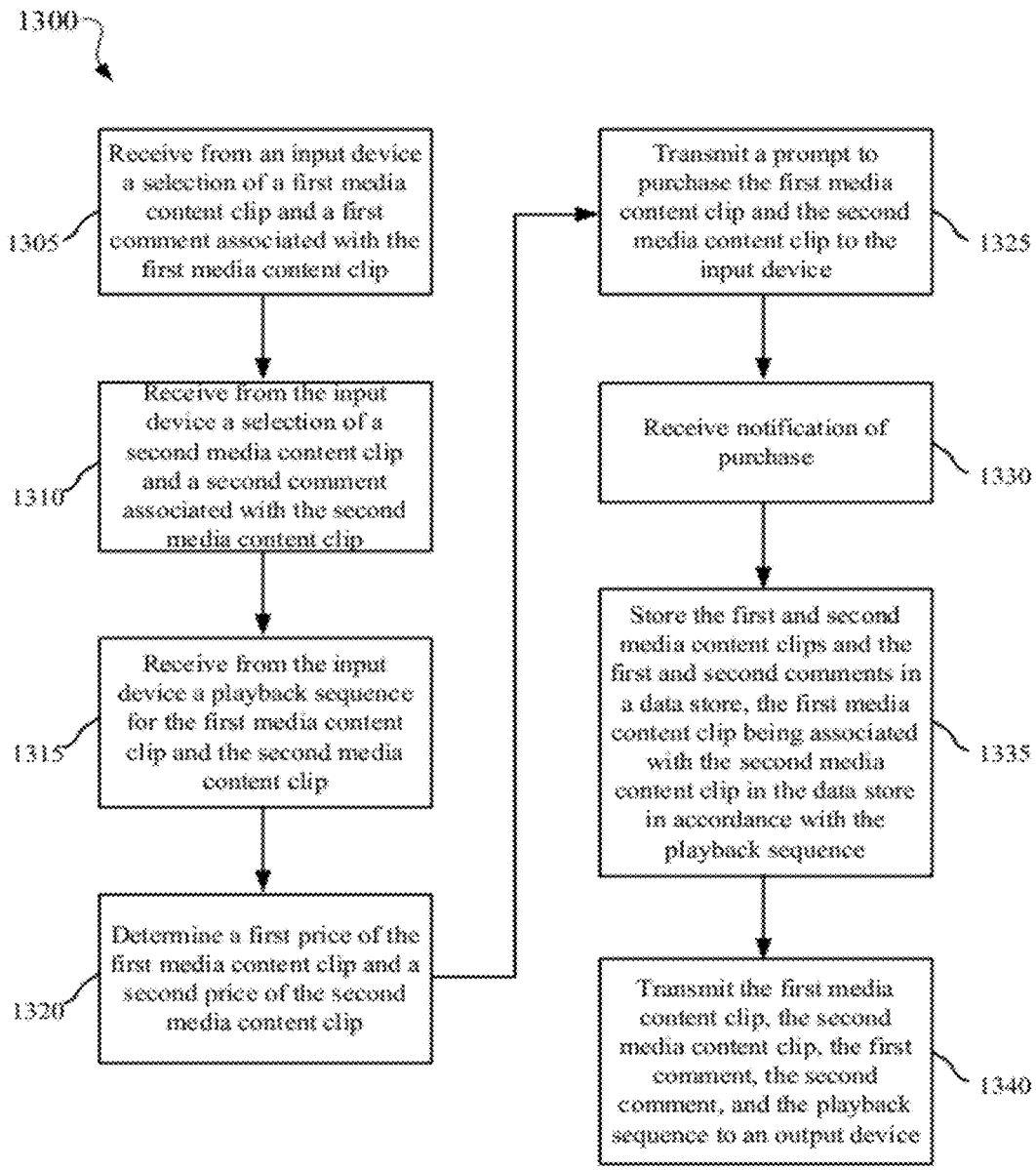
FIG. 13 is a flowchart diagram of an example method of associating comments with playback of media content according to various embodiments of the invention.

FIG. 13 is a flowchart diagram of an example method 1300 of associating comments with playback of media content. The method 1300 may be performed, for example, by the central server computer system 115 described above with reference to FIG. 1, 6, 8A, 8B, or 9. At block 1305, the central server computer system receives from an input device a selection of a first media content clip and a first comment associated with the first media content clip. The selection of the first media content clip may include a first point and a second point during a first media content. At block 1310, the central server computer system receives from the input device a selection of a second media content clip and a second comment associated with the second media content clip. The selection of the second media content clip may include a third point and a fourth point during a second media content.

At block 1315, a playback sequence for the first media content clip and the second media content clip is received from the input device. At block 1320, a first price of the first media content clip and a second price of the second media content clip are determined. At block 1325, a prompt is transmitted to the input device to purchase the first media content clip and the second media content clip at the determined prices. At block 1330, notification of the purchase is received. At block 1335, the first and second media content clips and the first and second comments are stored in a data store. The first media content clip is associated with the second media content clip at the data store in accordance with the received playback sequence. At block 1340, the first media content clip, the second media content clip, the first comment, the second comment, and the playback sequence are transmitted to an output device. In certain examples, the output device may only be permitted to temporarily cache or buffer the transmitted media content clips and/or comments, without permanently storing the media content clips and/or comments. Alternatively, a user of the output device may be permitted to purchase (e.g., for a higher price) the right to more permanently store the media content clips and/or comments.

Figure 14:
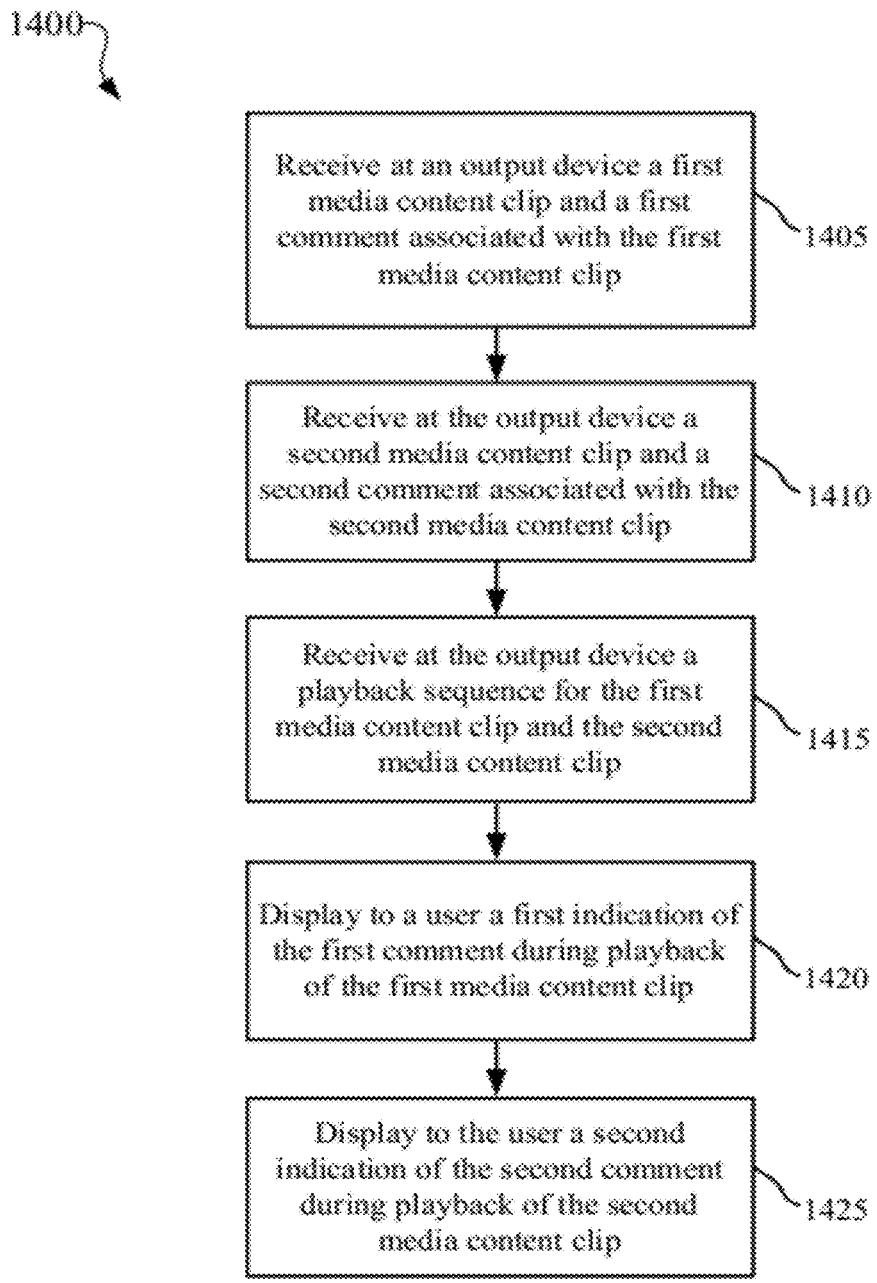
FIG. 14 is a flowchart diagram of an example method of associating comments with playback of media content according to various embodiments of the invention.

FIG. 14 is a flowchart diagram of an example method 1400 of associating comments with playback of media content. The method 1400 may be performed, for example, by the central output device 125 described above with reference to FIG. 1 or 9. At block 1405, a first media content clip and a first comment associated with the first media content clip are received at the output device. At block 1410, a second media content clip and a second comment associated with the second media content clip are received at the output device. At block 1415, a playback sequence for the first media content clip and the second media content clip is received from the output device. At block 1420, a first indication of the first comment is displayed to the user during playback of the first media content clip. At block 1425, a second indication of the second comment is displayed to the user during playback of the second media content clip.

Figure 15:
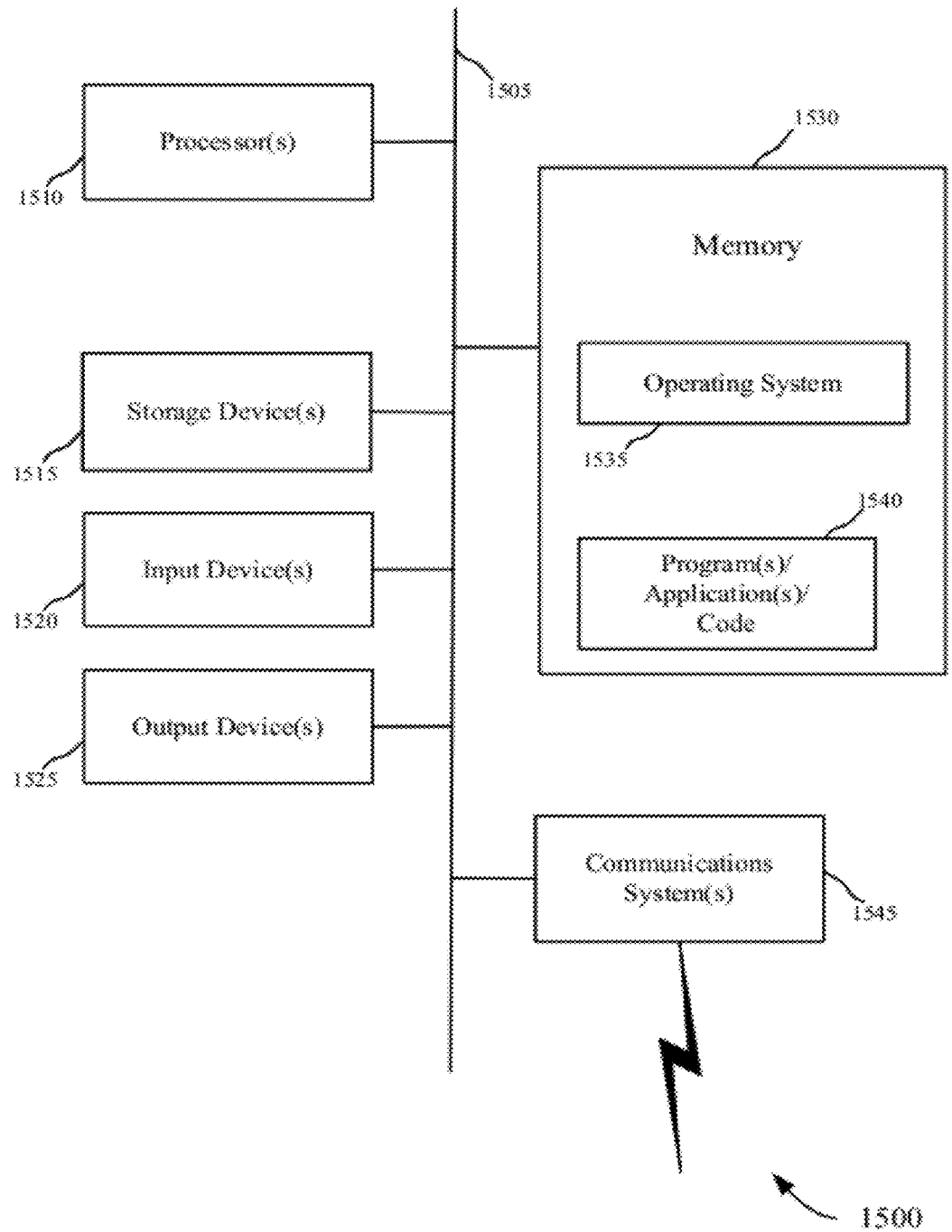
FIG. 15 is a schematic diagram that illustrates a representative device structure that may be used in various embodiments of the present invention.

A device structure 1500 that may be used for one or more input devices 105, the central server computer system 115, for one or more output devices 125, or for other computing devices described herein, is illustrated with the schematic diagram of FIG. 15. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1505, including processor(s) 1510 (which may further comprise a DSP or special-purpose processor), storage device(s) 1515, input device(s) 1520, and output device(s) 1525. The storage device(s) 1515 may be a machine-readable storage media reader connected to any machine-readable storage medium, the combination comprehensively representing remote, local, fixed, or removable storage devices or storage media for temporarily or more permanently containing computer-readable information. The communications system(s) interface 1545 may interface to a wired, wireless, or other type of interfacing connection that permits data to be exchanged with other devices. The communications system(s) interface 1545 may permit data to be exchanged with a network.

The structure 1500 may also include additional software elements, shown as being currently located within working memory 1530, including an operating system 1535 and other code 1540, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

What is claimed is:

1. A method of associating comments with playback of media content, the method comprising:
   receiving, from a user at an input device, a selection of a first point and a second point during a first media content being viewed by the user, the first point and the second point defining a first media content clip, and a first comment associated with the first media content clip;
   receiving, from the user at the input device, a selection of a second media content clip associated with the first media content clip, wherein the second media content clip comprises a third point and a fourth point of the first media content or a second media content, the third point and the fourth point defining the second media content clip, and a second comment associated with the second media content clip;
   receiving from the user at the input device a linking comment that associates the first media content clip with the second media content clip;
   identifying a playback sequence for the first media content clip and the second media content clip based at least in part on the linking comment; and
   creating a meta-media object comprising a reference to the first media content clip, the first comment, the second media content clip, the second comment, and the linking comment in accordance with the identified playback sequence.

2. The method of claim 1, further comprising transmitting the selection of the first point, the second point, and a first content identifier for the first media content clip, the third point, the fourth point, and a second content identifier for the second media content clip, the first comment, the second comment, the linking comment, and the playback sequence to a central server computer system over a network.

3. The method of claim 2, further comprising:
   generating time codes for the first point during playback of the first media content, the second point during the playback of the first media content, the third point during playback of the second media content, and the fourth point during the playback of the second media content;
   wherein the transmitting the selection of the first point and tile second point for the first media clip and the selection of the second media clip to the central server computer system comprises transmitting the generated time codes to the central server computer system.

4. The method of claim 1, further comprising:
receiving, from the user, a first price of the first media content clip and a second price of the second media content clip; and
displaying the first price and the second price to the input device.

5. The method of claim 4, wherein the first price is less than a price associated with an entirety of the first media content.

6. The method of claim 4, further comprising:
prompting the user of the input device to purchase the first media content clip at the first price and the second media content clip at the second price.

7. A method of associating comments with playback of media content, the method comprising:
receiving, from an input device, a selection of a first media content clip and a first comment associated with the first media content clip, the selection of the first media content clip comprising a first point and a second point during a first media content being presented to a user;
receiving, from the input device, a selection of a second media content clip associated with the first media content clip and a second comment associated with the second media content clip, the second media content clip comprising a third point and a fourth point of the first media content or a second media content;
receiving, from the input device, a linking comment that associates the first media content clip with the second media content clip;
receiving, from the input device, a playback sequence for the first media content clip and the second media content clip; and
storing a meta-media object comprising a reference to first media content clip, the second media content clip, the first comment, the second comment, and the linking comment in a data store, wherein the first media content clip is associated with the second media content clip at the data store in accordance with the playback sequence.

8. The method of claim 7, further comprising transmitting the reference to the first media content clip, the second media content clip, the first comment, the second comment, and the playback sequence to an output device over a network.

9. The method of claim 7, further comprising:
generating a first time code for the first point during the first media content, a second time code for the second point during the first media content, a third time code for the third point during the second media content, and a fourth time code for the fourth point during the second media content;
wherein storing the selections of the first and second media content clips at the data store comprises storing the first time code, the second time code, the third time code, and the fourth time code at the data store.

10. The method of claim 7, further comprising:
conditioning storage of the selections of the first and second media content clips and the first and second comments at the data store on payment of a first price associated with the first media content clip and a second price of the second media content clip.

11. A method of associating comments with playback of media content, the method comprising:
receiving at an output device a meta-media object comprising a reference to a first media content clip, a first comment associated with the first media content clip, a second media content clip, a second comment associated with the second media content clip, a linking comment associating the first media content clip with the second media content clip, and a playback sequence;
playing back the first media content clip and the second media content clip in accordance with the playback sequence; and
displaying to a user of the output device a first indication of the first comment during playback of the first media content clip, a second indication of the second comment during playback of the second media content clip, and a third indication of the linking comment during playback of the first media content clip and the second media content clip.

12. The method of claim 11 wherein:
the receiving the first media content clip comprises receiving a first time code for a first point during the playback of a first media content and a second time code for a second point during the playback of the first media content; and
the receiving the second media content clip comprises receiving a third time code for a third point during the playback of the second media content and a fourth time code for a fourth point during the playback of the second media content.

13. The method of claim 11, further comprising:
receiving a first price of the first media content clip and a second price of the second media content clip; and
displaying the first price and the second price to a user of the output device.

14. The method of claim 1, further comprising:
playing back the created meta-media object at the input device, wherein playing back the created meta-media object comprises displaying the first media content clip, the first comment, the second media content clip, the second comment, and the linking comment in accordance with the identified playback sequence.

15. The method of claim 14, wherein the linking comment comprises a third comment and a link to the second media content clip, the third comment being associated with a transition between the playback of the first media content clip and playback of the second media content clip.

16. The method of claim 1, wherein the first comment for the first media content clip comprises code for controlling an output device, the code used to reduce a volume of the first media content clip, slow the playback of the first media content clip, or both.

17. The method of claim 1, further comprising:
displaying, to the user, the second media content clip and a third media content clip;
receiving, from the user, a selection of the second media content clip, wherein the meta-media object is created based at least in part on the received selection.

18. The method of claim 1, wherein the first media content clip is associated with an additional comment from a second user viewing the first media content.

19. The method of claim 1, further comprising:
receiving, from a second user, the selection of the third point and the fourth point, the third point and the fourth point defining the second media content clip.

20. The method of claim 1, wherein the second media content clip is associated with the first media content, and wherein the first point and the third point share a common time code.

* * * * *